(12) United States Patent  (10) Patent No.: US 12,346,405 B2
Wang et al.                (45) Date of Patent:      Jul. 1, 2025

(54) JOINT PERCEPTION MODEL TRAINING METHOD, JOINT PERCEPTION METHOD, DEVICE, AND STORAGE MEDIUM

(71) Applicant: BEIJING BAIDU NETCOM SCIENCE TECHNOLOGY CO., LTD., Beijing (CN)

(72) Inventors: Jian Wang, Beijing (CN); Xiangbo Su, Beijing (CN); Qiman Wu, Beijing (CN); Zhigang Wang, Beijing (CN); Hao Sun, Beijing (CN); Errui Ding, Beijing (CN); Jingdong Wang, Beijing (CN); Tian Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 359 days.

(21) Appl. No.: 18/055,393

(22) Filed: Nov. 14, 2022

(65) Prior Publication Data

US 2023/0289402 A1    Sep. 14, 2023

(30) Foreign Application Priority Data

Mar. 8, 2022  (CN) .......................... 202210218587.8

(51) Int. Cl.
   *G06F 18/00*  (2023.01)
   *G06F 18/25*  (2023.01)
   (Continued)

(52) U.S. Cl.
   CPC .............. *G06F 18/00* (2023.01); *G06F 18/25* (2023.01); *G06N 3/045* (2023.01); *G06N 20/00* (2019.01);
   (Continued)

(58) Field of Classification Search
   CPC .......... G06F 18/00; G06F 18/25; G06V 10/40; G06V 10/454; G06V 10/764;
   (Continued)

(56) References Cited

U.S. PATENT DOCUMENTS

2020/0286383 A1   9/2020  Tran et al.
2021/0276587 A1   9/2021  Urtasun et al.
(Continued)

FOREIGN PATENT DOCUMENTS

CN    108108657 A     6/2018
CN    108985269 A    12/2018
(Continued)

OTHER PUBLICATIONS

Search machine translation of CN 113723377 A to Tan et al., A Traffic Sign Detecting Method Based On LD-SSD Network, translated 20 Ja, 2025, 19 pages. (Year: 2025).*

(Continued)

*Primary Examiner* — Henok Shiferaw
*Assistant Examiner* — Dennis Rosario
(74) *Attorney, Agent, or Firm* — Hunton Andrews Kurth LLP

(57) ABSTRACT

Provided are a joint perception model training method, a joint perception method, a device, and a storage medium. The joint perception model training method includes: acquiring sample images and perception tags of the sample images; acquiring a preset joint perception model, where the joint perception model includes a feature extraction network and a joint perception network; performing feature extraction on the sample images through the feature extraction network to obtain target sample features; performing joint perception through the joint perception network according to the target sample features to obtain perception prediction results; and training the preset joint perception model (Continued)

according to the perception prediction results and the perception tags, where the joint perception includes executing at least two perception tasks.

16 Claims, 14 Drawing Sheets

(51) Int. Cl.
*G06N 3/045* (2023.01)
*G06N 20/00* (2019.01)
*G06N 20/20* (2019.01)
*G06V 10/40* (2022.01)
*G06V 10/77* (2022.01)
*G06V 10/80* (2022.01)
*G06V 10/82* (2022.01)
*G06V 20/40* (2022.01)
*G06V 30/19* (2022.01)

(52) U.S. Cl.
CPC ............ *G06N 20/20* (2019.01); *G06V 10/40* (2022.01); *G06V 10/7715* (2022.01); *G06V 10/80* (2022.01); *G06V 10/806* (2022.01); *G06V 10/82* (2022.01); *G06V 20/46* (2022.01); *G06V 30/1918* (2022.01)

(58) Field of Classification Search
CPC ...... G06V 10/806; G06V 10/82; G06V 20/00; G06V 10/774; G06V 10/80; G06V 10/7715; G06V 10/42; G06V 10/462; G06V 20/46; G06V 30/1918; G06N 20/00; G06N 3/098; G06N 20/20; G06N 3/045; G06N 3/08; G06N 3/0464; G06T 2207/20081; G06T 2207/20084; G06T 3/4046; G06T 3/4053; G06T 2207/20016; G06T 5/60; G06T 2207/20221; G06T 3/40

See application file for complete search history.

(56) References Cited

U.S. PATENT DOCUMENTS

| | | | | |
|---|---|---|---|---|
| 2021/0407041 A1* | 12/2021 | Liu | ........................ | G06N 3/084 |
| 2022/0165045 A1* | 5/2022 | Jiang | .................... | G06F 18/2413 |
| 2022/0405537 A1* | 12/2022 | Yang | ...................... | G06F 18/256 |
| 2023/0080693 A1* | 3/2023 | Hu | ............................ | G06T 5/70 |
| | | | | 382/275 |

FOREIGN PATENT DOCUMENTS

| | | | | |
|---|---|---|---|---|
| CN | 110175641 | A | | 8/2019 |
| CN | 110298262 | A | | 10/2019 |
| CN | 110427827 | A | | 11/2019 |
| CN | 111178253 | A | | 5/2020 |
| CN | 111242176 | A | | 6/2020 |
| CN | 111783749 | A | | 10/2020 |
| CN | 112183449 | A | * | 1/2021 ............. G06F 21/32 |
| CN | 112528977 | A | | 3/2021 |
| CN | 110472400 | B | | 6/2021 |
| CN | 113435590 | A | | 9/2021 |
| CN | 113723377 | A | * | 11/2021 |
| CN | 113780152 | A | | 12/2021 |
| CN | 114021603 | A | | 2/2022 |
| CN | 114120454 | A | | 3/2022 |
| CN | 114973005 | A | * | 8/2022 |
| JP | 2018026040 | A | | 2/2018 |
| JP | 2022515895 | A | | 2/2022 |
| WO | 2021232771 | A1 | | 11/2021 |

OTHER PUBLICATIONS

Search machine translation of CN 112183449 A to Chen et al., A Driver Identity Verification Method, Device, Electronic Device And Storage Medium, translated Jan. 20, 2025, 21 pages. (Year: 2025).*

Cao et al., CaT: Weakly Supervised Object Detection with Category Transfer, Aug. 17, 2021 [retrievedd Jan. 20, 2025], Cornell University:arXiv, version: [v1], 10 pages. https://doi.org/10.48550/arXiv.2108.07487 (Year: 2021).*

Tang et al., Looking Twice for Partial Clues: Weakly-supervised Part-Mentored Attention Network for Vehicle Re-Identification, Jul. 17, 2021 [retrieved Jan. 20, 2025], Cornell University: arXiv, version [v1], 13 pages. https://doi.org/10.48550/arXiv.2107.08228 (Year: 2021).*

Abedalla et al., Chest X-ray pneumothorax segmentation using U-Net with EfficientNet and ResNet architectures, Jun. 29, 2021 [retrieved Jan. 20, 2025], PeerJ Computer Science 7:e607, 36 pages. DOI: 10.7717/peerj-cs.607 (Year: 2021).*

Chen et al., X-volution: On the unification of convolution and self-attention, Jun. 7, 2021 [retrieved Jan. 20, 2025], Cornell University: arXiv, version: [v2], 13 pages. https://doi.org/10.48550/arXiv.2106.02253 (Year: 2021).*

Zhang et al., Inception DenseNet With Hybrid Activations For Image Classification, Nov. 2-4, 2019 [retrieved Jan. 20, 2025], 2019 6th International Conference on Systems and Informatics (ICSAI), 7 pages. https://doi.org/10.1109/ICSAI48974.2019.9010081 (Year: 2019).*

Sun et al., Self-attention recurrent network for saliency detection, Sep. 17, 2018 [retrieved Jan. 20, 2025], Multimedia Tools and Applications, vol. 78, pp. 30793-30807. https://doi.org/10.1007/s11042-018-6591-3 (Year: 2018).*

Search machine translation of CN 114973005 A to Gao et al., A Green Bean Leaf Spot Identification Method Based On RePMMS-Net, translated May 10, 2025, 10 pages. (Year: 2025).*

Dargahi et al., Single Image Super Resolution Using Multi-path Convolutional Neural Network, Apr. 28 & 29, 2021 [retrieved May 9, 2025], 2021 5th International Conference on Pattern Recognition and Image Analysis (IPRIA), 6 pages. Doi: 10.1109/IPRIA53572.2021.9483573 (Year: 2021).*

First Chinese Office Action, The State Intellectual Property Office of People's Republic of China, mailed to CN Application No. 202210218587.8 on Apr. 19, 2022, 15 pages.

First Search Report issued Aug. 24, 2024 in corresponding Chinese Application No. 202210605586.9.

First Office Action posted Aug. 24, 2024 in corresponding Chinese Application No. 202210605586.9.

Notice of Reasons for Refusal issued in corresponding JP Application No. 2023-018251 on Feb. 6, 2024, 12 pages.

Supplemental Search Report issued Feb. 20, 2025 in corresponding Chinese Application No. 202210605586.9.

\* cited by examiner

JOINT PERCEPTION MODEL TRAINING METHOD, JOINT PERCEPTION METHOD, DEVICE, AND STORAGE MEDIUM

CROSS-REFERENCE TO RELATED APPLICATION(S)

This application claims priority to Chinese Patent Application No. 202210218587.8 filed Mar. 8, 2022, the disclosure of which is incorporated herein by reference in its entirety.

TECHNICAL FIELD

The present disclosure relates to the technical field of artificial intelligence and, in particular, to computer vision, image recognition, and deep learning technologies. Specifically, the present disclosure relates to a joint perception model training method, a joint perception method, a device, and a storage medium.

BACKGROUND

With the continuous development of computer science, artificial intelligence technology emerges. As a new technical science, artificial intelligence researches and develops theories, methods, technologies, and application systems which are used for simulating, extending and expanding human intelligence.

Image processing based on artificial intelligence technology is of great significance for the construction of smart traffic, smart security, and smart city.

SUMMARY

The present disclosure provides a joint perception model training method, a joint perception method, a device, and a storage medium.

According to an aspect of the present disclosure, a joint perception model training method is provided. The method includes the following.

Sample images and perception tags of the sample images are acquired.

A preset joint perception model is acquired. The joint perception model includes a feature extraction network and a joint perception network.

Feature extraction is performed on the sample images through the feature extraction network to obtain target sample features.

Joint perception is performed through the joint perception network according to the target sample features to obtain perception prediction results.

The preset joint perception model is trained according to the perception prediction results and the perception tags. The joint perception includes executing at least two perception tasks.

According to another aspect of the present disclosure, a joint perception method is provided. The method includes the following.

Prediction images are acquired.

The prediction images are input to a target joint perception model to obtain perception prediction results.

The target joint perception model is obtained based on an initial joint perception model trained by the joint perception model training method according to any embodiment of the present disclosure.

According to another aspect of the present disclosure, an electronic device is provided. The electronic device includes at least one processor and a memory communicatively connected to the at least one processor.

The memory stores instructions executable by the at least one processor. The instructions are executed by the at least one processor to cause the at least one processor to execute the joint perception model training method according to any embodiment of the present disclosure and/or the joint perception method according to any embodiment of the present disclosure.

According to another aspect of the present disclosure, a non-transitory computer-readable storage medium storing computer instructions is provided. The computer instructions are configured to cause a computer to execute the joint perception model training method according to any embodiment of the present disclosure and/or the joint perception method according to any embodiment of the present disclosure.

According to the technologies of the present disclosure, the data operation amount of the joint perception process is reduced, and the computation efficiency is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

Embodiments of the present disclosure are applicable to the case of multi-task joint perception of images under at least one category of targets and provide technical support for the construction of smart city, smart traffic, and smart security. The multi-task joint perception may include at least two executions of a target detection task, a target attribute recognition task, and a target search feature extraction task. The target is a to-be-annotated object in an image. The to-be-annotated object is subjected to target detection, attribute recognition, or search feature extraction.

It is to be noted that since the joint perception process for images needs to be implemented based on a joint perception model, the training process of the joint perception model is first described in detail for ease of understanding.

Figure 1:
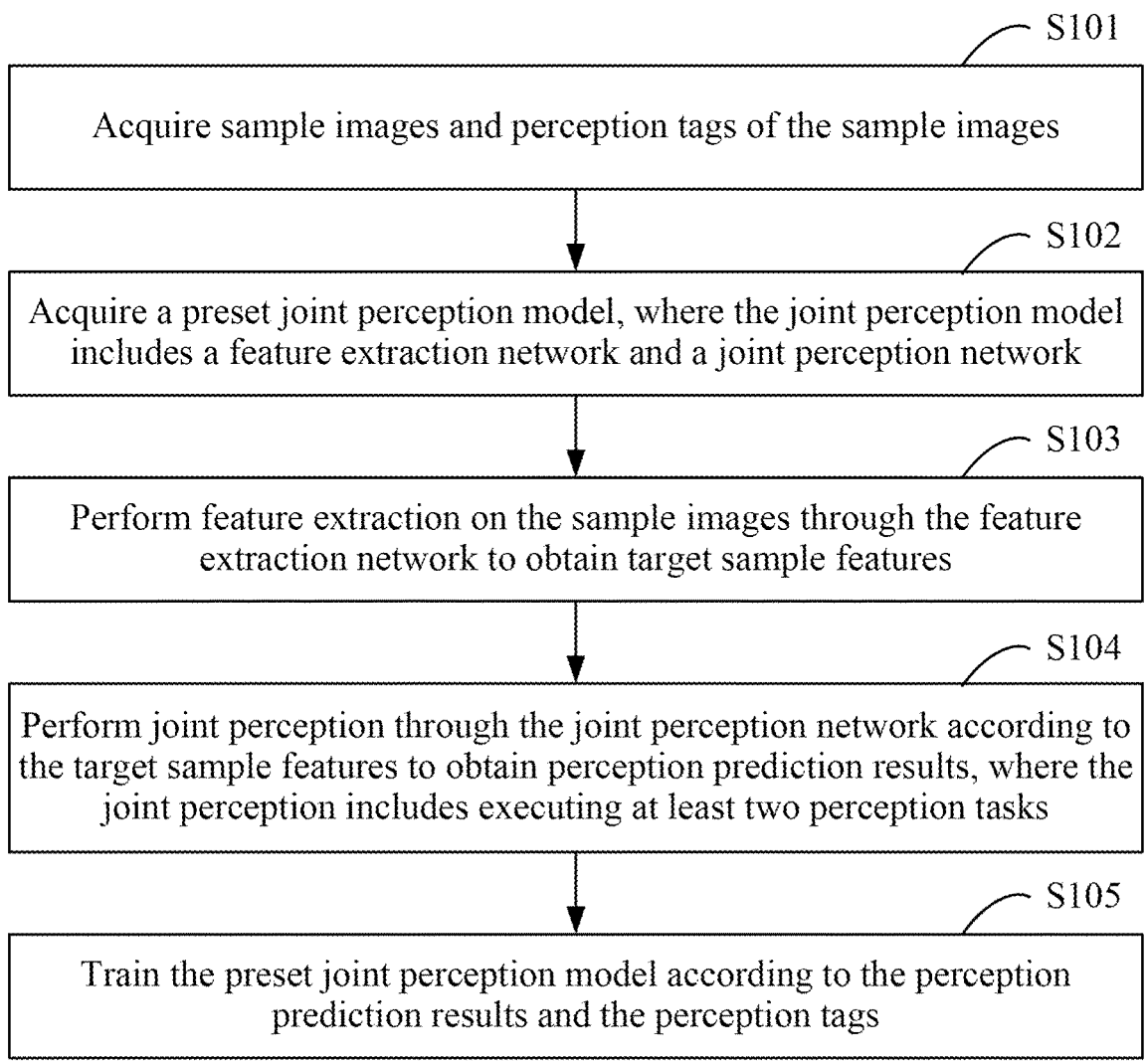
FIG. 1 is a flowchart of a joint perception model training method according to an embodiment of the present disclosure.

FIG. 1 is a flowchart of a joint perception model training method according to an embodiment of the present disclosure. This method is applicable to an application scenario in which a joint perception model with a multi-task joint perception function is trained. The joint perception model training method provided by this embodiment of the present disclosure may be executed by a joint perception model training apparatus. This apparatus may be implemented by using software and/or hardware and is specifically configured in an electronic device.

As shown in FIG. 1, a joint perception model training method includes the following steps.

In S101, sample images and perception tags of the sample images are acquired.

The sample images are the images used in the model training process. The perception tags of the sample images are used for representing the theoretical results after performing joint perception on the sample images. The theoretical results may include standard perception results corresponding to different perception tasks. The joint perception may include at least two perception tasks of target detection, target attribute recognition, and target search feature extraction.

Exemplarily, standard perception results corresponding to the target detection task may include the position of the annotation frame of a to-be-annotated object, for example, may include at least one of coordinates, size, scale, or confidence level of the annotation frame. Standard perception results corresponding to the attribute recognition task may include at least one attribute category of a to-be-annotated object. For example, a vehicle may include a vehicle color or a vehicle type, a human face may include a gender, or a human body may include a clothing color. Standard perception results corresponding to the search feature extraction task may include eigenvectors for image retrieval.

In an alternative embodiment, the sample images may be picture frames obtained by performing frame extraction processing on video streaming data.

To reduce the impact of sample differences on the model training process, in an alternative embodiment, different sample images may be preprocessed uniformly.

Exemplarily, the sample images may be scaled to unify the image sizes of different sample images. Exemplarily, the sample images may be performed normalization processing. For example, the RGB (red green blue) color mean is uniformly subtracted from each sample image to enhance the robustness of the trained model.

In S102, a preset joint perception model is acquired. The joint perception model includes a feature extraction network and a joint perception network.

In S103, feature extraction is performed on the sample images through the feature extraction network to obtain target sample features.

In S104, joint perception is performed through the joint perception network according to the target sample features to obtain perception prediction results. The joint perception includes executing at least two perception tasks.

In S105, the preset joint perception model is trained according to the perception prediction results and the perception tags.

The joint perception model may be constructed by using a machine learning model or a deep learning model.

Perception prediction results may be prediction results corresponding to different perception tasks. For example, the perception prediction results may include at least one of the position of the annotation frame of a to-be-annotated object predicted under the target detection task, at least one attribute category of a to-be-annotated object predicted under the attribute recognition task, or predicted eigenvectors for image search under the search feature extraction task.

Figure 2:
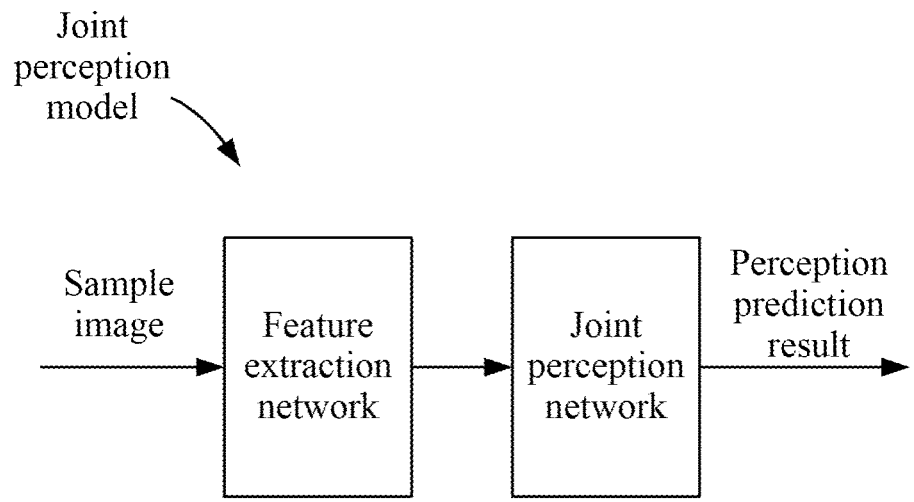
FIG. 2 is a diagram illustrating the structure of a joint perception model according to an embodiment of the present disclosure.

Referring to the structure diagram of a joint perception model shown in FIG. 2, the joint perception model includes a feature extraction network and a joint perception network. The feature extraction network performs feature extraction on sample images to obtain target sample features. The joint perception network performs joint perception according to the target sample features to obtain perception prediction results. According to the difference between the perception prediction results and perception tags, the network parameters in the joint perception model are optimized until the model performance of the joint perception model tends to be stable or the number of training samples reaches a preset number threshold to obtain a trained joint perception model. The trained joint perception model is used for performing subsequent joint perception prediction on input images.

It is to be noted that through sharing target sample features extracted by the feature extraction network for different prediction tasks in the joint perception network, in the model training process, the feature extraction network in the joint perception model learns the extraction capability of visual features corresponding to different perception tasks, and an independent feature extraction network does not need to be set separately for different perception tasks. Thus, a large number of computation resources are saved, and the computation efficiency is improved. Meanwhile, the features between different perception tasks are mutually enhanced to promote the feature representation of a single perception task.

The target sample features include visual features corresponding to different perception tasks, which are used as data support for subsequent joint perception performed by the joint perception network.

In an alternative embodiment, the feature extraction network may be implemented based on a feature pyramid network, thereby performing multi-scale feature extraction to improve feature richness of target sample features.

Although the feature extraction network learns the extraction capability of the visual features corresponding to different perception tasks, there may be a situation that the information of the features corresponding to part of the perception tasks is lost, resulting in a decrease in the richness and the comprehensiveness of the extracted features. Thus, the accuracy of the perception results of the joint perception model is affected.

To further improve the joint perception capability of the model, in another alternative embodiment, the feature extraction network may be improved to further enhance the joint extraction capability of multi-scale features under different perception tasks in the feature extraction network.

Figure 3A:
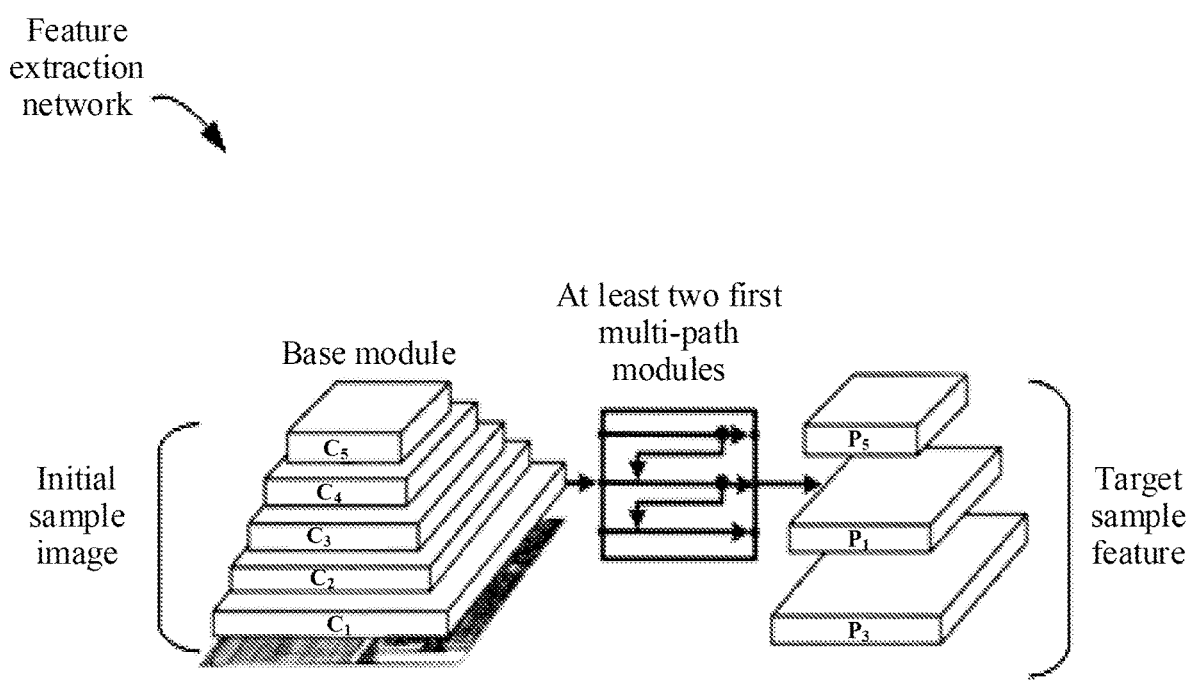
FIG. 3A is a diagram illustrating the structure of a feature extraction network according to an embodiment of the present disclosure.

Referring to the diagram of a feature extraction network shown in FIG. 3A, the feature extraction network may be further refined to include a base module and at least two first multi-path modules. The base module performs downsampling on sample images to obtain initial sample features of different scales. The first multi-path modules perform feature extraction of different perception tasks on the initial sample features to obtain target sample features under scales corresponding to the initial sample features.

That is, the sample images are downsampled by the base module to obtain initial sample features of different scales. For initial sample features of any scale, the first multi-path module corresponding to the scale performs feature extraction of different perception tasks on the initial sample features of the scale to obtain the target sample features under the scale.

FIG. 3A exemplarily shows initial sample features of five different scales $C_1$ to $C_5$ obtained by using the base module to downsample the sample images step by step. $C_3$ to $C_5$ are separately processed by the corresponding first multi-path modules to obtain target sample features $P_3$ to $P_5$. It is to be noted that the preceding merely exemplifies the number of initial sample features and the number of target sample features and should not be construed as specifical limitation on the number of initial sample features and the number of target sample features. Those skilled in the art may make corresponding adjustments of number according to actual needs.

It is to be understood that the first multi-path modules are introduced into the feature extraction network to separately perform feature extraction of different perception tasks on initial sample features under a single scale. Thus, the feature extraction network has the multi-scale feature extraction capability under different perception tasks, thereby improving the richness and comprehensiveness of the extracted target sample features and laying a foundation for improving the model accuracy of the joint perception model.

In an alternative embodiment, initial sample features of a single scale may be fused with target sample features of other scales to update the initial sample features of the single scale. Thus, the richness of the target sample features resulting from the processing of the single scale by the corresponding first multi-path module is increased.

In an embodiment, in the processing process of first multi-path modules for adjacent scales, target sample features of the smaller one of the adjacent scales are fused with initial sample features of the larger one of the adjacent scales to update the initial sample features of the larger one of the adjacent scales. Thus, the richness of the initial sample features of the larger one is increased, and the accuracy of output results of target sample features of the larger one is improved.

It is to be noted that joint perception can be performed based on target sample features of each single scale, and perception prediction results of different scales are fused to obtain final perception prediction results. Alternatively, target sample features of different scales can be fused, and the fused results can be jointly perceived to obtain final perception prediction results.

The specific structure of a first multi-path module in the feature extraction network is described in detail below.

Figure 3B:
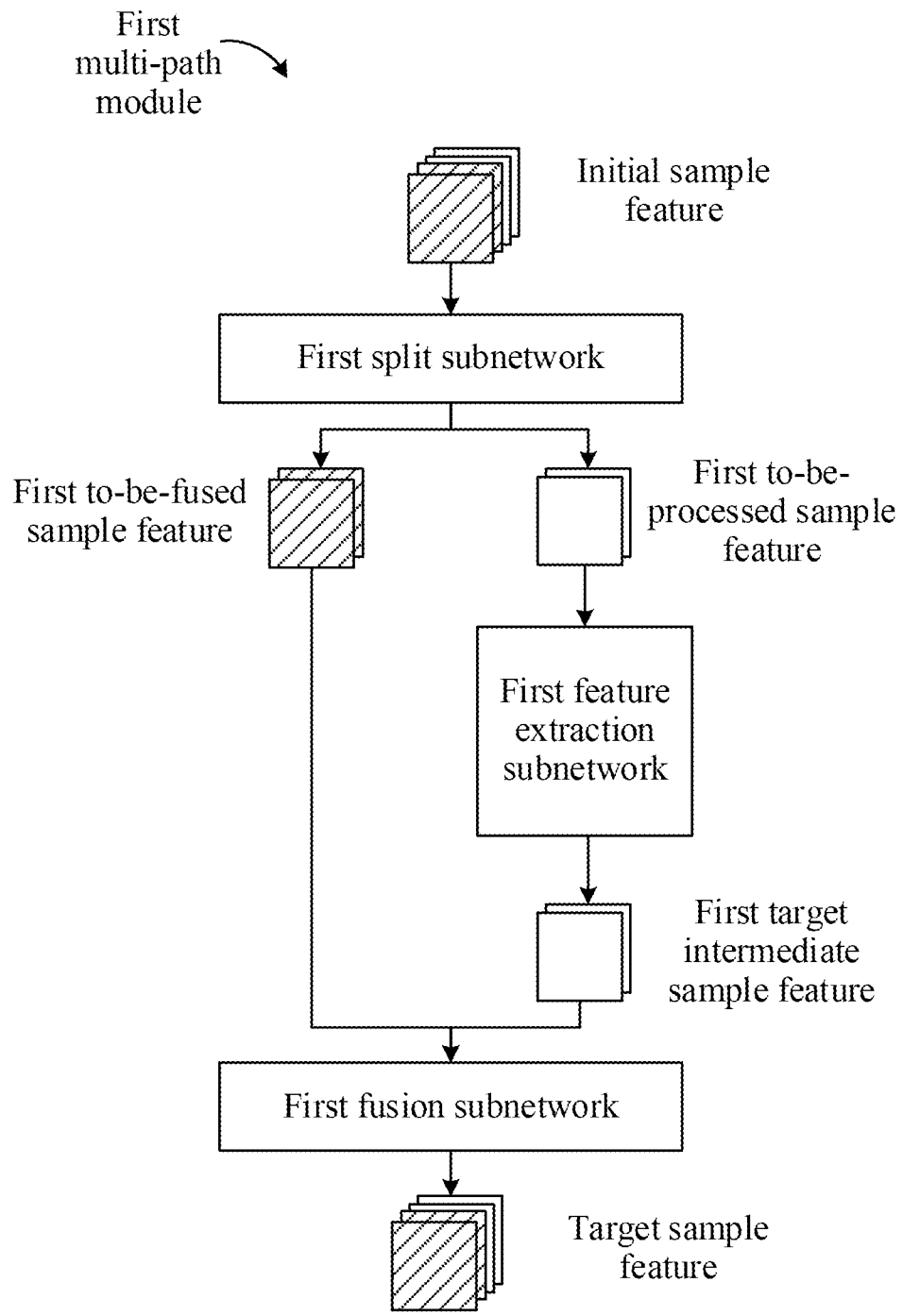
FIG. 3B is a diagram illustrating the structure of a first multi-path module according to an embodiment of the present disclosure.

Referring to the structure diagram of a first multi-path module shown in FIG. 3B, for initial sample features of a single scale, the first multi-path module may be refined to include a first split subnetwork, a first feature extraction subnetwork, and a first fusion subnetwork. The first split subnetwork splits the initial sample features according to a channel dimension to obtain first to-be-fused sample features and first to-be-processed sample features. The first feature extraction subnetwork performs feature extraction on the first to-be-processed sample features to obtain first target intermediate sample features. The first fusion subnetwork performs feature fusion on the first to-be-fused sample features and the first target intermediate sample features to obtain target sample features under the scale.

Exemplarily, at least two sets of split results may be obtained by splitting the initial sample features according to the channel dimension. When splitting is performed, random splitting or sequential splitting can be performed according to the channel dimension. The present disclosure does not make any limitation on the specific splitting mechanism, and only needs to ensure that splitting is performed according to the channel dimension. It is to be noted that the present disclosure does not make any limitation on the number of channels of features in different split results.

To facilitate subsequent processing, the number of split results can be limited as two, that is, initial sample features are split to obtain first to-be-fused sample features and first to-be-processed sample features. To facilitate the splitting operation, initial sample features may be split into first to-be-fused sample features and first to-be-processed sample features through sequential splitting. Optionally, the number of channels of the first to-be-fused sample features and the number of channels of the first to-be-processed sample features may be the same.

It is to be understood that by performing feature extraction on the first to-be-processed sample features of the initial sample features, instead of performing feature extraction on all the initial sample features, the number of channels in the feature extraction process is reduced (the number of channels is halved when the number of channels of the first to-be-fused sample features is the same as the number of channels of the first to-be-processed sample features). Thus, the amount of computation and the volume of dynamic random-access memory occupied in the feature extraction process are reduced. Meanwhile, feature fusion is performed on the first target intermediate sample features obtained by performing feature extraction on the first to-be-fused sample features and the first to-be-processed sample features of the initial sample features. The number of gradient paths is increased (the number of gradient paths is doubled when the number of channels of the first to-be-fused sample features is the same as the number of channels of the first to-be-processed sample features). The learning capability of the trained model is improved.

Taking an initial sample feature in a shape of (n, c, h, w) as an example, the processing process of a first multi-path module is described. n denotes the number of sample images. c denotes the number of channels. h denotes the height of a sample image. w denotes the width of a sample image. The initial sample feature is evenly split along the channel dimension to obtain a first to-be-fused sample feature in a shape of (n, c/2, h, w) and a first to-be-processed sample feature in a shape of (n, c/2, h, w). Feature extraction is performed on the first to-be-processed sample feature in a shape of (n, c/2, h, w) through a first feature extraction subnetwork to obtain a first target intermediate sample feature in a shape of (n, c/2, h, w). Since the number of channels is halved in the feature extraction process, the amount of computation and the volume of dynamic random-access memory occupied are reduced in the feature extraction process. Feature fusion is performed on the first to-be-fused sample feature in a shape of (n, c/2, h, w) and the first target intermediate sample feature in a shape of (n, c/2, h, w) to obtain a target sample feature in a shape of (n, c, h, w). The number of gradient paths is doubled, thereby improving the learning capability of the trained model.

To improve the comprehensiveness and richness of the extracted features of the first feature extraction subnetwork, in an alternative embodiment, the extraction of features of different dimensions may be performed in the first feature extraction subnetwork.

Figure 3C:
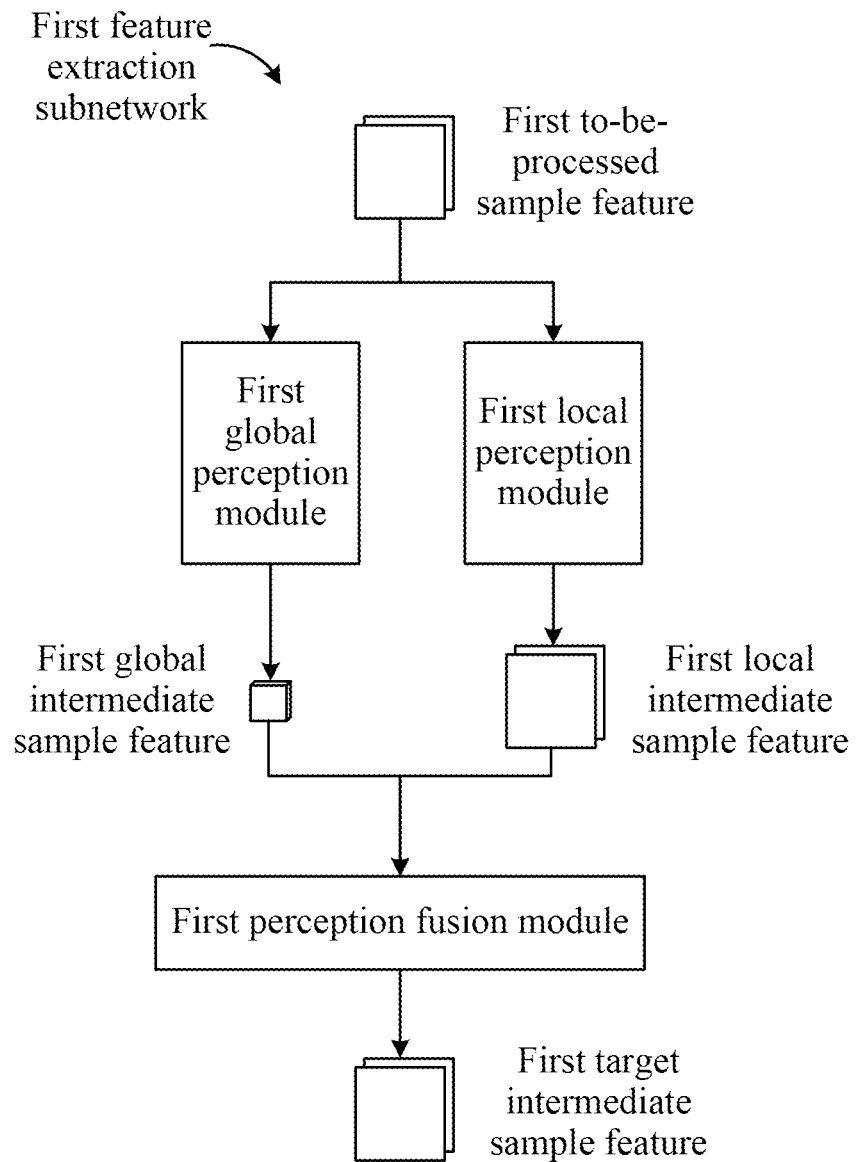
FIG. 3C is a diagram illustrating the structure of a first feature extraction subnetwork according to an embodiment of the present disclosure.

Referring to the diagram of a first feature extraction subnetwork shown in FIG. 3C, the first feature extraction subnetwork may be configured to include a first global perception module, a first local perception module, and a first perception fusion module. The first global perception module performs global feature extraction on first to-be-processed sample features to obtain a first global intermediate sample feature. The first local perception module performs local feature extraction on the first to-be-processed sample features to obtain first local intermediate sample features. The first perception fusion module performs feature fusion on the first global intermediate sample feature and the first local intermediate sample features to obtain first target intermediate sample features.

It is to be understood that feature extraction is performed on the first to-be-processed sample features separately from the global dimension and the local dimension, and the obtained first global intermediate sample feature and the obtained first local intermediate sample features are fused. Thus, the first target intermediate sample features obtained after fusion not only carry overall context information, but also carry local details, thereby improving the richness and comprehensiveness of the first target intermediate sample features.

Figure 3D:
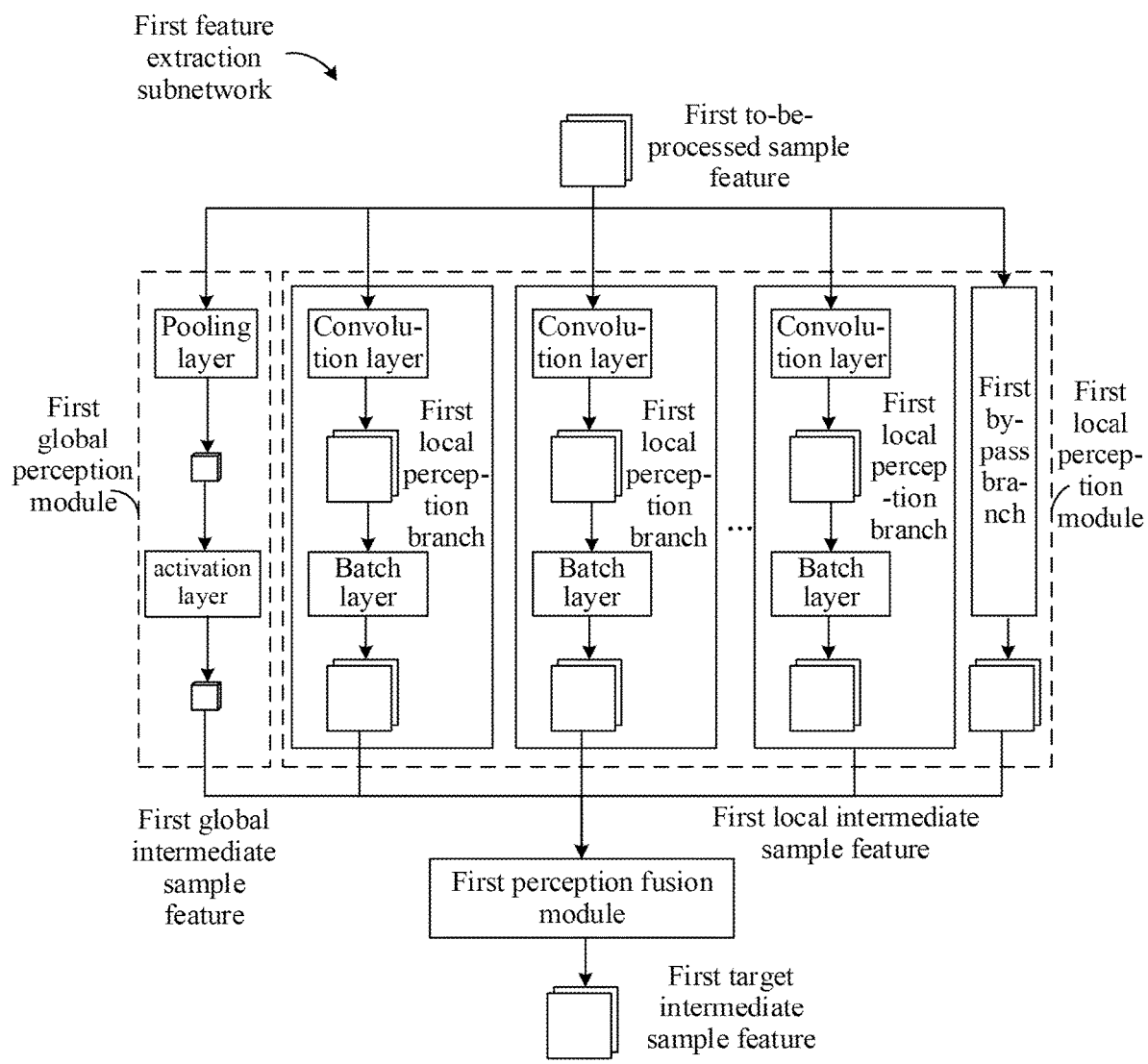
FIG. 3D is a diagram illustrating the structure of a first feature extraction subnetwork according to an embodiment of the present disclosure.

In an alternative embodiment, referring to the diagram of a first feature extraction subnetwork shown in FIG. 3D, the first global perception module in the first feature extraction subnetwork may include pooling layers and an activation layer. The pooling layers are configured to perform global feature extraction on first to-be-processed sample features. The activation layer is configured to perform nonlinear computation on global feature extraction results, thereby improving the non-linear feature extraction capability of the first global perception module.

It is to be noted that this embodiment of the present disclosure does not make any limitation on the specific pooling manner used by the pooling layers and the specific activation function used by the activation layer. These may be set or adjusted according to actual requirements and model training conditions. For example, the pooling layers may use average pooling, and the activation layer may use the ReLU activation function.

In an alternative embodiment, the first local perception module may be provided with at least one first local perception branch for local feature extraction according to actual requirements.

Exemplarily, still referring to FIG. 3D, at least two first local perception branches may be disposed in the first local perception module in the first feature extraction subnetwork. Different first local perception branches perform local feature extraction on the first to-be-processed sample features under different receptive fields to obtain first local intermediate sample features under corresponding receptive fields. Accordingly, a first perception fusion module may first fuse (for example, pixel superposition) first local intermediate sample features under different receptive fields to obtain first local intermediate sample feature fusion results. The first local intermediate sample feature fusion results are fused (for example, channel multiplication) with a first global intermediate sample feature to obtain first target intermediate sample features.

It is to be understood that by providing at least two first local perception branches to perform local feature extraction under different receptive fields, the richness of the first local intermediate sample features is improved, thereby helping to improve the subsequent annotation capability to to-be-annotated objects of different scales and sizes and laying a foundation for annotation of multi-category targets. Meanwhile, through local feature extraction under different receptive fields, the extracted features can support different perception tasks, and the perception accuracy of the joint perception model is helped to improve.

In an embodiment, a convolution layer and a batch layer may be disposed in a first local perception branch. The convolution layer is configured to perform local feature extraction under a corresponding receptive field according to a convolution kernel. The batch layer is configured to perform normalization processing on the extracted features, thereby assimilating the distribution of the extracted first local intermediate sample features of different first local perception branches, accelerating model convergence, and improving the stability of the training process.

It is to be noted that the scales of the convolution kernels used in different first local perception branches are different. Thus, different first local perception branches can perform local feature extraction under different receptive fields. The number of convolution kernels can be set or adjusted by those skilled in the art according to needs or empirical values. The types of convolution kernels can be specifically set according to the perception tasks of joint perception. Exemplarily, for a target search feature extraction task, since the search process typically requires multi-granularity features, both large-scale convolution kernels and small-scale convolution kernels need to be set. Exemplarily, for an attribute recognition task and a target detection task, horizontal or vertical convolution kernels and the like need to be set for different target categories. Specifically, a 1*3 convolution kernel and a 3*5 convolution kernel may be used to perform local block modeling on a human body, thereby obtaining better human retrieval features. In a specific example, convolution kernels of 1*1, 1*3, 3*1, 3*3, 3*5, 5*3, and 5*5 may be used in first local perception branches, respectively, for performing multi-scale and multi-directional feature extraction.

With continuing reference to FIG. 3D, in an alternative embodiment, a first bypass branch may be added in the first local perception module to further accelerate model convergence. Optionally, the first bypass branch may be a direct connection structure, thereby directly taking the first to-be-processed sample features as the first local intermediate sample features, reducing vanishing gradient, and accelerating model convergence. Alternatively, a first batch module may be disposed in the first bypass branch and corresponds to a batch layer. The first batch module performs normalization processing on the first to-be-processed sample features to obtain the first local intermediate sample features, thereby assimilating the distribution of the first local intermediate sample features in different branches and accelerating model convergence.

The preceding exemplarily describes the specific structure of the feature extraction network in the joint perception model. The joint perception network in the joint perception model is described in detail below.

Figure 4A:
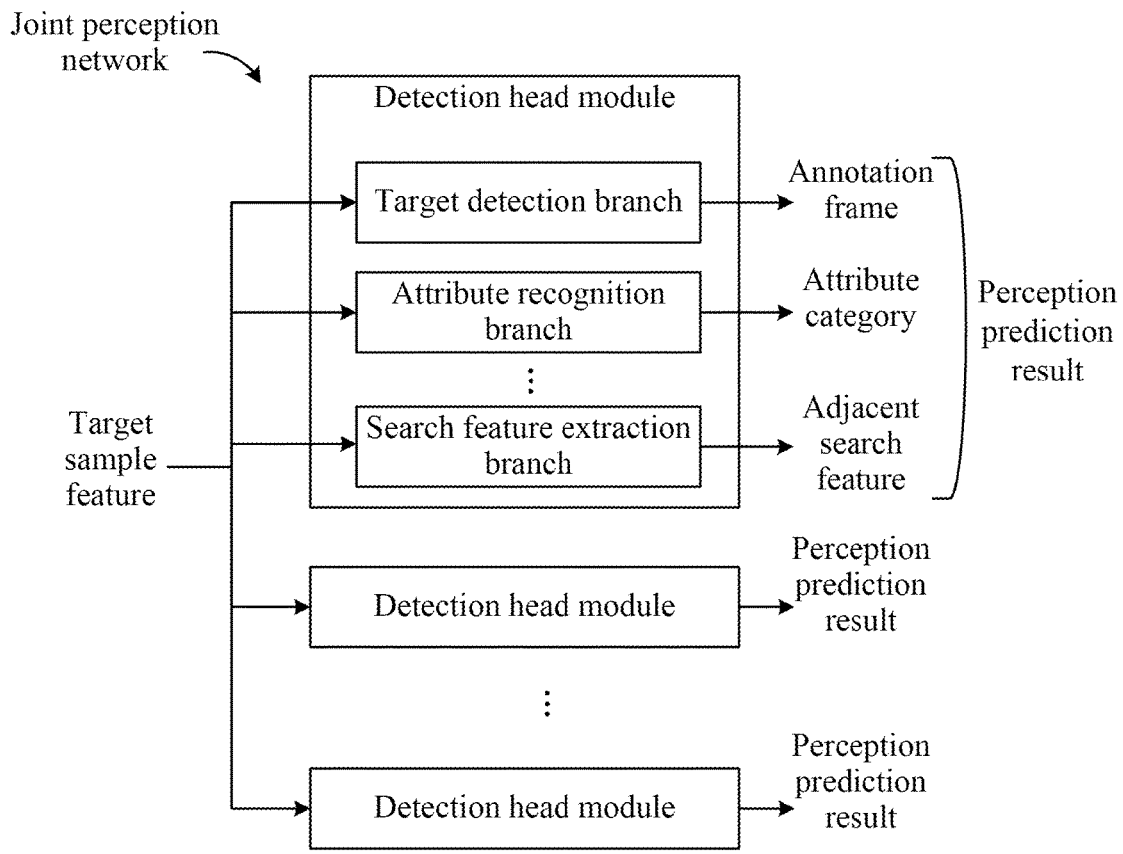
FIG. 4A is a diagram illustrating the structure of a joint perception network according to an embodiment of the present disclosure.

Referring to the diagram of a joint perception network shown in FIG. 4A, the joint perception network may include detection head modules. A detection head module is provided with different task perception branches and configured to perform joint perception on target sample features through the different task perception branches to obtain perception prediction results of the perception tasks.

Exemplarily, a task perception branch may include at least one of a target detection branch, an attribute recognition branch, or a search feature extraction branch. The target detection branch corresponds to the target detection task and is configured to detect to-be-annotated objects (that is, targets of a certain category) in an image. The attribute recognition branch corresponds to the attribute recognition task and is configured to recognize at least one attribute category of to-be-annotated objects in an image. The search feature extraction branch corresponds to the search feature extraction task and is configured to perform eigenvectors extraction which is convenient for image search.

It is to be noted that the preceding different task perception branches merely exemplarily describe different task perception branches in a detection head module and should not be construed as specifically limiting the task perception branches. The addition, deletion, or modification of task perception branches may be performed according to actual requirements.

It is to be understood that by setting detection head modules with different task perception branches in the joint perception network, the joint perception network has the joint perception capability for different perception tasks. A single perception model is not required to be established and trained for a certain perception task, thereby improving the convenience in the case of multiple perception tasks and the versatility of the joint perception model.

To enable the joint perception model to learn joint perception capabilities for different perception tasks in different categories of targets, in an alternative embodiment, the number of detection head modules in the joint perception network may be set to at least two. Different detection head modules perform joint perception on different categories of targets. In this manner, the advantages are that there is no need to train corresponding joint perception models for different categories of targets, and the versatility of the joint perception model is improved. In addition, the same feature extraction network is shared by different perception tasks under different categories of targets. Therefore, a lot of computation is saved, and the feature extraction network can learn the visual features of different perception tasks under different categories of targets during model training. The richness of the extracted features is improved, and the model accuracy of the joint perception model is helped to improve.

In a specific example, a human face detection head module, a human body detection head module, a motor vehicle detection head module, and a non-motor vehicle detection head module may be disposed in a joint perception network. The human face detection head module is configured to perform joint perception of different perception tasks on a human face target. The human body detection head module is configured to perform joint perception of different perception tasks on a human body target. The motor vehicle detection head module is configured to perform joint perception of different perception tasks on a motor vehicle target. The non-vehicle detection head module is configured to perform joint perception of different perception tasks on a non-vehicle target.

When at least two categories of targets exist in sample images, in an alternative embodiment, other network structures may be introduced to enhance the pertinence of detection head modules to different categories of targets in the joint perception process.

Figure 4B:
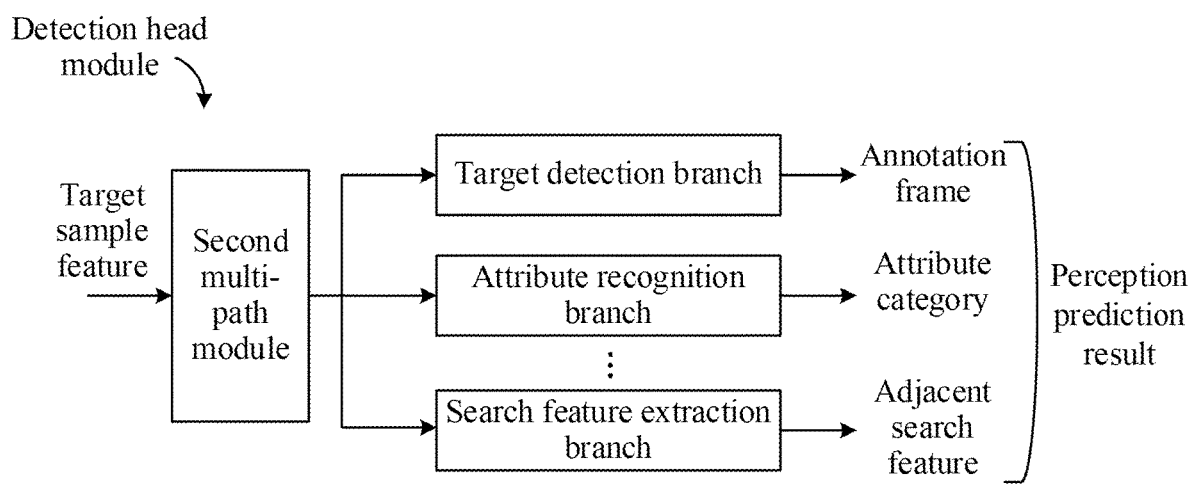
FIG. 4B is a diagram illustrating the structure of a detection head module according to an embodiment of the present disclosure.

Referring to the diagram of a detection head module shown in FIG. 4B, the detection head module in the joint perception network may include a second multi-path module and at least two task perception branches (for example, the target detection branch, the attribute recognition branch, and the search feature extraction branch shown in FIG. 4B).

The second multi-path module in the detection head module performs feature extraction of the same category of targets under different perception tasks on the target sample features to obtain perception sample features. Each task perception branch determines the perception prediction result of the corresponding perception task according to the perception sample features.

That is, the second multi-path module performs feature extraction of the same category of targets under different perception tasks on target sample features to obtain perception sample features. Each task perception branch shares the perception sample features and performs joint perception according to the perception sample features to obtain the perception prediction result under the corresponding perception task.

It is to be understood that, by introducing the second multi-path module into the detection head module in the joint perception network, the target sample features output by the feature extraction network is performed extraction of the visual features corresponding to different perception tasks under the same category of targets. Thus, the extracted features can be matched with the category targets corresponding to the detection head module, and the extracted visual features are more targeted. The accuracy of perception prediction results of different perception tasks corresponding to different categories of targets is helped to be improved.

It is to be noted that target sample features of a single scale can be separately used as input data of each detection head module corresponding to the same category of targets. Joint perception can be performed on category targets corresponding to detection head modules. Joint perception results of detection head modules of the same category of targets under different scales are fused according to perception task dimensions to obtain final perception prediction results of corresponding categories of targets. Alternatively, target sample features of different scales can be fused. The fused results can be used as input data of detection head modules to perform joint perception on category targets corresponding to detection head modules to obtain final perception prediction results of corresponding categories of targets.

The specific structure of the second multi-path module of a detection head module in the joint perception network is described in detail below. It is to be noted that the second multi-path module in the detection head module has the same structure as the first multi-path module in the preceding feature extraction network. The network parameters may be the same or different and are specifically determined according to actual training conditions.

Figure 4C:
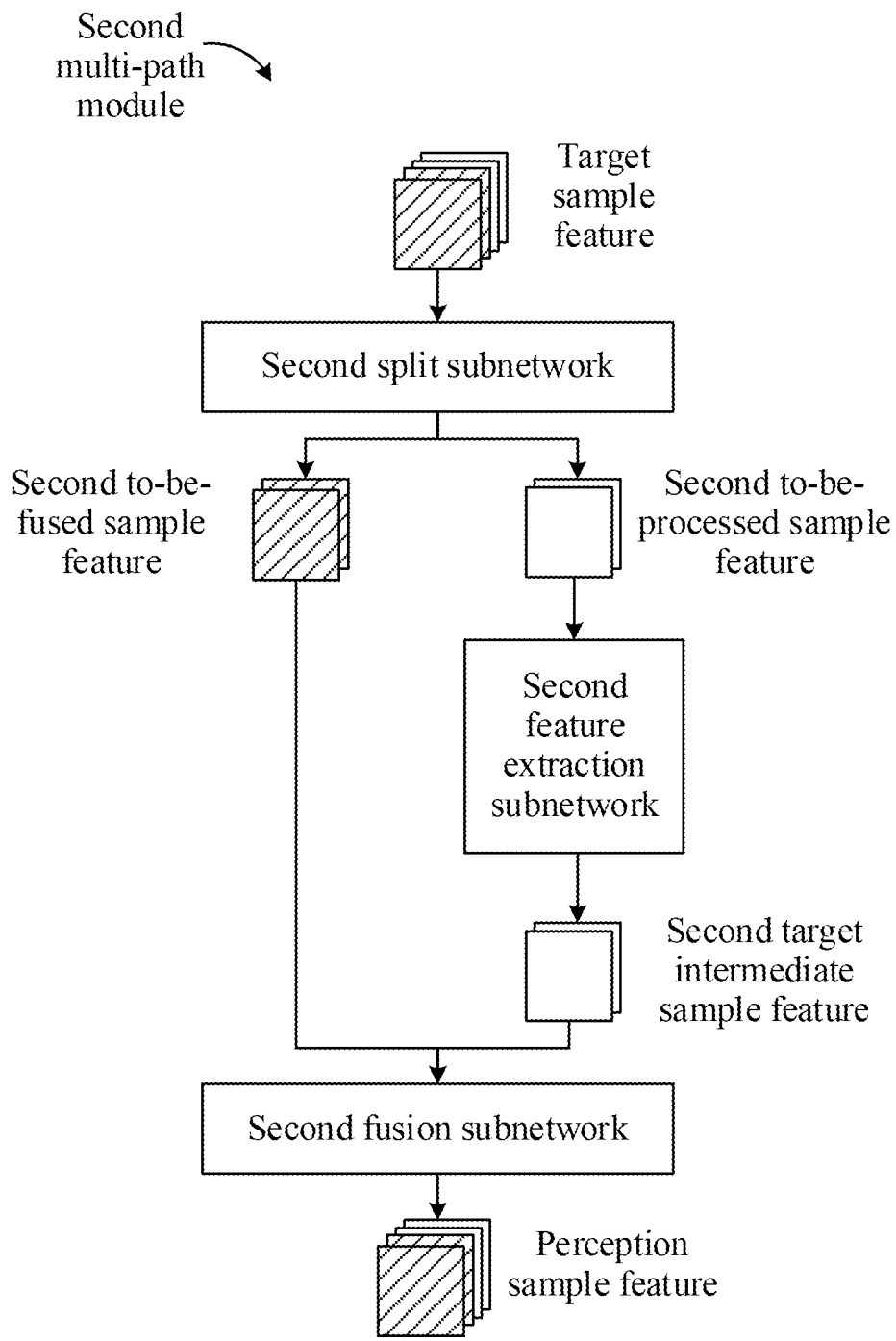
FIG. 4C is a diagram illustrating the structure of a second multi-path module according to an embodiment of the present disclosure.

Referring to the structure diagram of a second multi-path module shown in FIG. 4C, the second multi-path module may be refined to include a second split subnetwork, a second feature extraction subnetwork, and a second fusion subnetwork. The second split subnetwork splits target sample features according to a channel dimension to obtain second to-be-fused sample features and second to-be-processed sample features. The second feature extraction subnetwork performs feature extraction on the second to-be-processed sample features to obtain second target intermediate sample features. The second fusion subnetwork performs feature fusion on the second to-be-fused sample features and the second target intermediate sample features to obtain perception sample features.

Exemplarily, at least two sets of split results may be obtained by splitting the target sample features according to the channel dimension. When splitting is performed, random splitting or sequential splitting can be performed according to the channel dimension. The present disclosure does not limit the specific splitting mechanism, and only needs to ensure that splitting is performed according to the channel dimension. It is to be noted that the present disclosure does not make any limitation on the number of channels of features in different split results.

To facilitate subsequent processing, the number of split results can be limited as two, that is, target sample features are split to obtain second to-be-fused sample features and second to-be-processed sample features. To facilitate the splitting operation, target sample features may be split into second to-be-fused sample features and second to-be-processed sample features through sequential splitting. Optionally, the number of channels of the second to-be-fused sample features and the number of channels of the second to-be-processed sample features may be the same.

It is to be understood that by performing feature extraction on the second to-be-processed sample features of the target sample features, instead of performing feature extraction on the full target sample features, the number of channels in the feature extraction process is reduced (the number of channels is halved when the number of channels of the second to-be-fused sample features is the same as the number of channels of the second to-be-processed sample features). Thus, the amount of computation and the volume of dynamic random-access memory occupied in the feature extraction process are reduced. Meanwhile, feature fusion is performed on the second target intermediate sample features obtained by performing feature extraction on the second to-be-fused sample features and the second to-be-processed sample features of the target sample features. The number of gradient paths is increased (the number of gradient paths is doubled when the number of channels of the second to-be-fused sample features is the same as the number of channels of the second to-be-processed sample features). The learning capability of the trained model is improved.

Taking a target sample feature in a shape of (n, c, h, w) as an example, the processing process of a second multi-path module is described. n denotes the number of sample images. c denotes the number of channels. h denotes the height of a sample image. w denotes the width of a sample image. The target sample feature is evenly split along the channel dimension to obtain a second to-be-fused sample feature in a shape of (n, c/2, h, w) and a second to-be-processed sample feature in a shape of (n, c/2, h, w). Feature extraction is performed on the second to-be-processed sample feature in a shape of (n, c/2, h, w) through a second feature extraction subnetwork to obtain a second target intermediate sample feature in a shape of (n, c/2, h, w). Since the number of channels is halved in the feature extraction process, the amount of computation and the volume of dynamic random-access memory occupied are reduced in the feature extraction process. Feature fusion is performed on the second to-be-fused sample feature in a shape of (n, c/2, h, w) and the second target intermediate sample feature in a shape of (n, c/2, h, w) to obtain a target sample feature in a shape of (n, c, h, w). The number of gradient paths is doubled, thereby improving the learning capability of the trained model.

To improve the comprehensiveness and richness of the extracted features of the second feature extraction subnetwork, in an alternative embodiment, the extraction of features of different dimensions may be performed in the second feature extraction subnetwork.

Figure 4D:
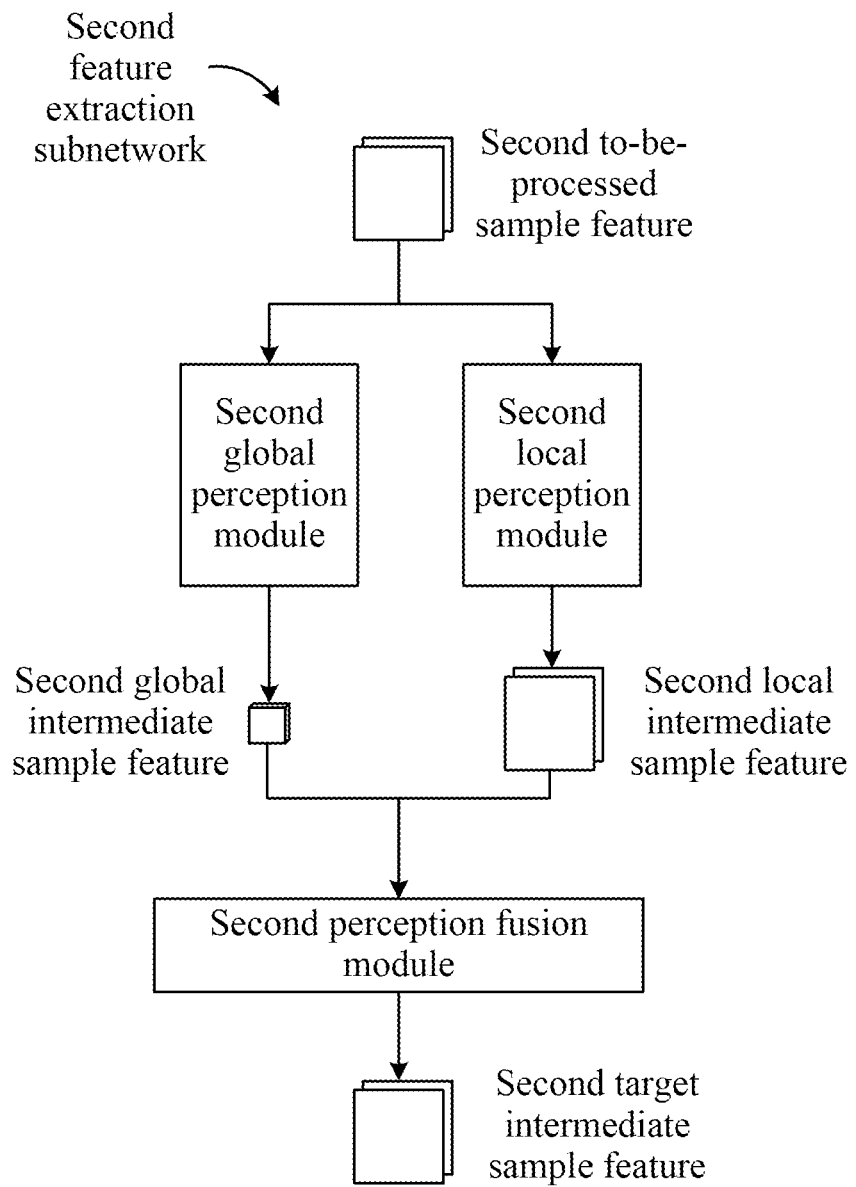
FIG. 4D is a diagram illustrating the structure of a second feature extraction subnetwork according to an embodiment of the present disclosure.

Referring to the diagram of a second feature extraction subnetwork shown in FIG. 4D, the second feature extraction subnetwork may be configured to include a second global perception module, a second local perception module, and a second perception fusion module. The second global perception module performs global feature extraction on second to-be-processed sample features to obtain a second global intermediate sample feature. The second local perception module performs local feature extraction on the second to-be-processed sample features to obtain second local intermediate sample features. The second perception fusion module performs feature fusion on the second global intermediate sample feature and the second local intermediate sample features to obtain second target intermediate sample features.

It is to be understood that feature extraction is performed on the second to-be-processed sample features separately from the global dimension and the local dimension, and the obtained second global intermediate sample feature and the obtained second local intermediate sample features are fused. Thus, the second target intermediate sample features obtained after fusion not only carry overall context information, but also carry local details, thereby improving the richness and comprehensiveness of the second target intermediate sample features.

Figure 4E:
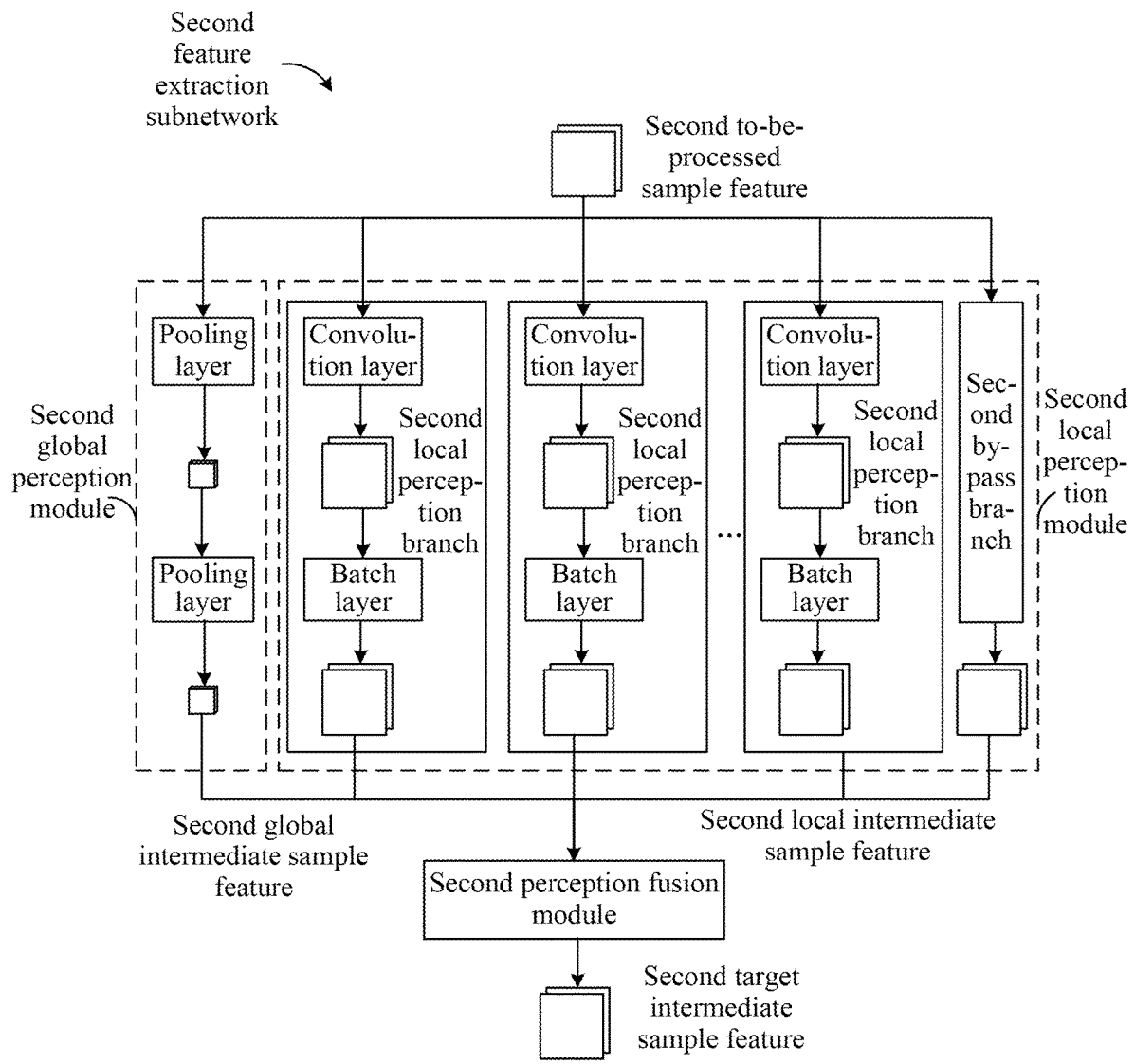
FIG. 4E is a diagram illustrating the structure of a second feature extraction subnetwork according to an embodiment of the present disclosure.

In an alternative embodiment, referring to the diagram of a second feature extraction subnetwork shown in FIG. 4E, the second global perception module in the second feature extraction subnetwork may include pooling layers and an activation layer. The pooling layers are configured to perform global feature extraction on second to-be-processed sample features. The activation layer is configured to perform nonlinear computation on global feature extraction results, thereby improving the non-linear feature extraction capability of the second global perception module.

It is to be noted that this embodiment of the present disclosure does not make any limitation on the specific pooling manner used by the pooling layers and the specific activation function used by the activation layer. These may be set or adjusted according to actual requirements and model training conditions. For example, the pooling layers may use average pooling, and the activation layer may use the ReLU activation function.

In an alternative embodiment, the second local perception module may be provided with at least one second local perception branch for local feature extraction according to actual requirements.

Exemplarily, referring to the diagram of the second feature extraction subnetwork shown in FIG. 4E, at least two second local perception branches may be disposed in the second local perception module in the second feature extraction subnetwork. Different second local perception branches perform local feature extraction on the second to-be-processed sample features under different receptive fields to obtain second local intermediate sample features under corresponding receptive fields. Accordingly, a second perception fusion module may first fuse (for example, pixel superposition) second local intermediate sample features under different receptive fields to obtain second local intermediate sample feature fusion results. The second local intermediate sample feature fusion results are fused (for example, channel multiplication) with a second global intermediate sample feature to obtain second target intermediate sample features.

It is to be understood that by providing at least two second local perception branches to perform local feature extraction under different receptive fields, the richness of the second local intermediate sample features is improved, thereby helping to improve the subsequent annotation capability to to-be-annotated objects of different scales and sizes and laying a foundation for annotation of multi-category targets. Meanwhile, through local feature extraction under different receptive fields, the extracted features can support different perception tasks, and the perception accuracy of the joint perception model is helped to improve.

In an embodiment, a convolution layer and a batch layer may be disposed in a second local perception branch. The convolution layer is configured to perform local feature extraction under a corresponding receptive field according to a convolution kernel. The batch layer is configured to perform normalization processing on the extracted features, thereby assimilating the distribution of the extracted second local intermediate sample features of different second local perception branches, accelerating the model convergence, and improving the stability of the training process.

It is to be noted that the scales of the convolution kernels used in different second local perception branches are different. Thus, different second local perception branches can perform local feature extraction under different receptive fields. The number of convolution kernels can be set or adjusted by those skilled in the art according to needs or empirical values. The types of convolution kernels can be specifically set according to the perception tasks of joint perception. Exemplarily, for a target search feature extraction task, since the search process typically requires multi-granularity features, both large-scale convolution kernels and small-scale convolution kernels need to be set. Exemplarily, for an attribute recognition task and a target detection task, horizontal or vertical convolution kernels and the like need to be set for different target categories. Specifically, a $1*3$ convolution kernel and a $3*5$ convolution kernel may be used to perform local block modeling on a human body, thereby obtaining better human retrieval features. In a specific example, convolution kernels of $1*1$, $1*3$, $3*1$, $3*3$, $3*5$, $5*3$, and $5*5$ may be used in local perception branches, respectively, for performing multi-scale and multi-directional feature extraction.

Still referring to FIG. 4E, in an alternative embodiment, a second bypass branch may be added in the second local perception module to further accelerate model convergence. Optionally, the second bypass branch may be a direct connection structure, thereby directly taking the second to-be-processed sample features as the second local intermediate sample features, reducing vanishing gradient, and accelerating model convergence. Alternatively, a second batch module may be disposed in the second bypass branch and corresponds to a batch layer. The second batch module performs normalization processing on the second to-be-processed sample features to obtain the second local intermediate sample features, thereby assimilating the distribution of the second local intermediate sample features in different branches and accelerating model convergence.

The preceding describes the training process of the joint perception model in detail. The joint perception method is described in detail below through the use process of the joint perception model.

Figure 5:
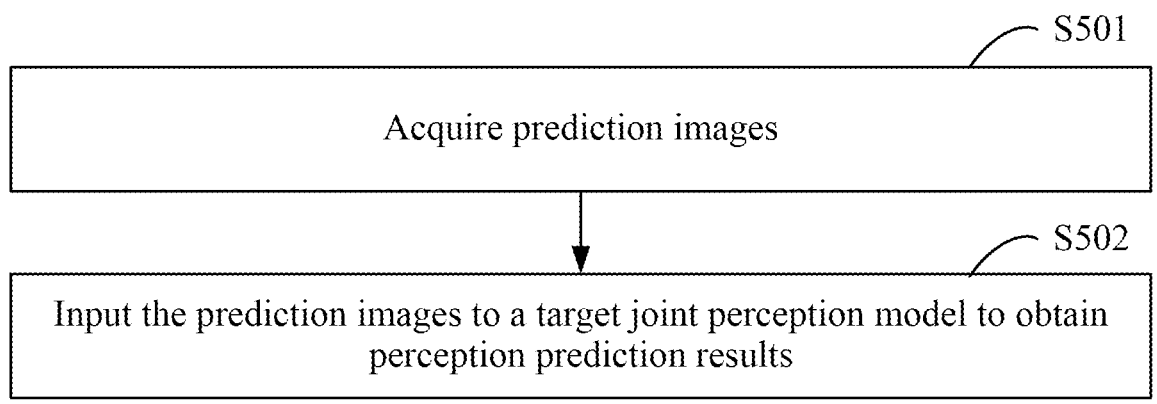
FIG. 5 is a flowchart of a joint perception method according to an embodiment of the present disclosure.

FIG. 5 is a flowchart of a joint perception method according to an embodiment of the present disclosure. This method is applied to an application scenario in which joint perception of different perception tasks is performed by using a joint perception model with a multi-task joint perception function. The joint perception method provided by this embodiment of the present disclosure may be executed by a joint perception apparatus. This apparatus may be implemented by using software and/or hardware and is specifically configured in an electronic device. It is to be noted that the electronic device performing the joint perception method and the electronic device performing the joint perception model training method may be the same device or different devices, and the present disclosure is not limited thereto.

Referring to FIG. 5, a joint perception method includes the following.

In S501, prediction images are acquired.

The prediction images are images to be jointly perceived. Exemplarily, the prediction images may be picture frames obtained by performing frame extraction processing on video streaming data.

In an alternative embodiment, to improve the accuracy of the perception prediction results of the prediction images subsequently, the prediction images may be preprocessed in this alternative embodiment. The preprocessing manner is consistent with the preprocessing manner of the sample images in training the joint perception model.

Exemplarily, the prediction images may be scaled such that the sizes of the prediction images are consistent with the sizes of the preprocessed sample images. Exemplarily, the prediction images may be performed normalization processing. For example, the RGB color mean is subtracted from the prediction images.

In S502, the prediction images are input to a target joint perception model to obtain perception prediction results.

The target joint perception model is obtained based on an initial joint perception model trained by the joint perception model training method according to any embodiment of the present disclosure. The perception prediction results may be prediction results corresponding to different perception tasks. For example, the perception prediction results may include at least one of the position of the annotation frame of a to-be-annotated object predicted under a target detection task, at least one attribute category of a to-be-annotated object predicted under an attribute recognition task, or predicted eigenvectors for image search under a search feature extraction task.

Optionally, the preceding trained joint perception model, that is, the initial joint perception model, may be directly used as the target joint perception model. Alternatively, the initial joint perception model may be post-processed to improve inference performance. The post-processed result may be used as the target joint perception model.

It is to be noted that the target joint perception model used in the present disclosure is determined based on the preceding trained initial joint perception model. For different perception tasks, the joint perception network in the initial joint perception model shares the target prediction features extracted by the feature extraction network. An independent feature extraction network does not need to be set separately for different perception tasks. Thus, a large number of computation resources are saved, and the computation efficiency is improved.

The feature extraction network in the initial joint perception model includes a first multi-path module. The first multi-path module includes a first feature extraction subnetwork. The first local perception module in the first feature extraction subnetwork is set to include at least two first local perception branches. Due to the manner of multiple local perception branches, in the inference stage, that is, when the initial joint perception model obtained through training is directly used to determine the perception prediction results of the prediction images, a large number of computation resources are invested, and the inference efficiency is relatively low.

To reduce the operation amount in the inference stage and improve the inference efficiency, the first local perception module in the initial joint perception model may be replaced with an equivalent module with less time-consuming and less operation amount to obtain the target joint perception model.

In an alternative embodiment, the target joint perception model may be obtained by performing reparameterization on at least two first local perception branches. That is, in the first multi-path module in the feature extraction network in the initial joint perception model, at least two first local perception branches in the first local perception module in the first feature extraction subnetwork can be performed reparameterization. The single-path structure obtained after reparameterization replaces the at least two original first local perception branches. Alternatively, if the first local perception module of the first multi-path module includes at least two first local perception branches and a first bypass branch, the at least two first local perception branches and the first bypass branch in the first local perception module of the first multi-path module in the feature extraction network in the initial joint perception model can be performed reparameterization together. The single-path structure obtained after reparameterization replaces the at least two original first local perception branches and the original first bypass branch.

It is to be noted that the computation device used to perform reparameterization may be an electronic device that performs the joint perception model training method, an electronic device that performs the joint perception method, or other devices. This is not limited by the present disclosure. In addition, the present disclosure does not limit the specific execution timing of reparameterization, and only needs to ensure that the timing is after obtaining the trained initial joint perception model and before using the target joint perception model.

It is to be understood that by performing reparameterization on the first multi-path module in the feature extraction network in the initial joint perception model, the complexity of the feature extraction network in the used joint perception model can be reduced while maintaining rich feature extraction. Thus, the data operation amount of the inference process in which the first feature extraction subnetwork processes the input data to obtain corresponding output results is reduced, and the inference efficiency is improved.

In an embodiment, parameters of convolution layers and batch layers in first local perception branches in the feature extraction network may be firstly merged to obtain parameters merging results of different first local perception branches. Then, network parameters of different first local perception branches and/or network parameters of a first bypass branch are merged to obtain final reparameterization results. The equivalent replacement structure configuration of the first local perception module in the first feature extraction subnetwork in the first multi-path module in the feature extraction network is optimized by using the final reparameterization results.

Specifically, the first local perception module may be performed reparameterization by using the following formula:

$$F' = \sum_{i=1}^{n}\left(\frac{\gamma_i}{\sigma_i} F_i\right)$$

$$b' = \sum_{i=1}^{n}\left(-\frac{\mu_i \gamma_i}{\sigma_i} + \beta_i\right).$$

$F_i$ denotes the convolution kernel of the convolution layer of the i-th branch. $\mu_i$ and $\sigma_i$ denote the mean of the batch layer of the i-th branch and the variance of the batch layer of the i-th branch. $\gamma_i$ and $\beta_i$ denote the scale factor of the batch layer and horizontal shift factor of the batch layer. F' and b' denote the convolution kernel and the bias term parameter after re-parameterization.

Figure 6A:
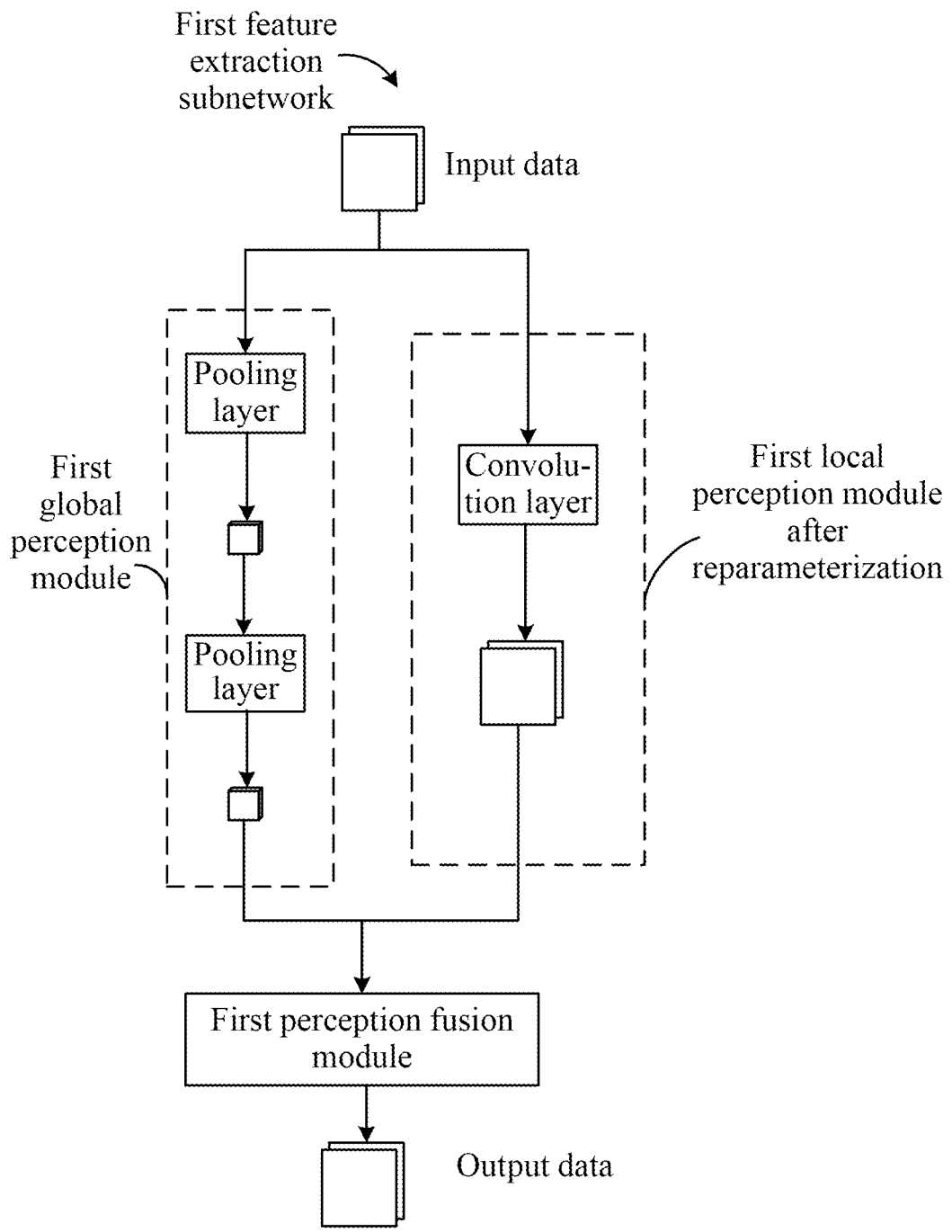
FIG. 6A is a diagram illustrating the structure of a first feature extraction subnetwork after reparameterization according to an embodiment of the present disclosure.

Referring to the diagram of a first feature extraction subnetwork after reparameterization shown in FIG. 6A, the first local perception module in the first feature extraction subnetwork replaces the multi-branch first local perception module in the initial joint perception model (referring to FIG. 3D) with a single-path structure. The convolution layer can be configured merely according to the results after reparameterization. Thus, the model results are greatly simplified, and the inference efficiency is helped to improve. In a specific example, if convolution kernels of 1*1, 1*3, 3*1, 3*3, 3*5, 5*3, and 5*5 are used in first local perception branches in the first local perception module in the model training stage, the size of the convolution kernel of the convolution layer after reparameterization is 5*5.

The joint perception network in the initial joint perception model includes a detection head module. A second multi-path module is disposed in the detection head module. The second multi-path module includes a second feature extraction subnetwork. The second local perception module in the second feature extraction subnetwork is set to include at least two second local perception branches. Due to the manner of multiple local perception branches, in the inference stage, that is, when the initial joint perception model obtained through training is directly used to determine perception prediction results of prediction images, a large number of computation resources are invested, and the inference efficiency is relatively low.

To reduce the operation amount in the inference stage and improve the inference efficiency, the second local perception module of the second multi-path module in the initial joint perception model may be replaced with an equivalent module with less time-consuming and less operation amount to obtain a target joint perception model.

In an alternative embodiment, the target joint perception model may be obtained by performing reparameterization on at least two second local perception branches. That is, at least two second local perception branches in the second local perception module of the second multi-path module of the detection head module in the initial joint perception model can be performed reparameterization. The single-path structure obtained after reparameterization replaces the at least two original second local perception branches in the second local perception module of the second multi-path module of the detection head module. Alternatively, if the second local perception module of the second multi-path module includes second local perception branches and a second bypass branch, at least two second local perception branches and the second bypass branch in the second local perception module of the second multi-path module of the detection head module in the initial joint perception model can be performed reparameterization together. The single-path structure obtained after reparameterization replaces the at least two original second local perception branches and the original second bypass branch.

It is to be noted that the computation device used to perform reparameterization may be an electronic device that performs the joint perception model training method, an electronic device that performs the joint perception method, or other devices. This is not limited by the present disclosure. In addition, the present disclosure does not limit the specific execution timing of reparameterization, and only needs to ensure that the timing is after obtaining the trained initial joint perception model and before using the target joint perception model.

It is to be understood that by performing reparameterization on the second multi-path module in the joint perception network in the initial joint perception model, the complexity of the joint perception network in the used joint perception model can be reduced while maintaining rich feature extraction. Thus, the data operation amount of the inference process in which the second feature extraction subnetwork processes the input data to obtain corresponding output results is reduced, and the inference efficiency is improved.

In an embodiment, parameters of convolution layers and batch layers in second local perception branches in the detection head module in the joint perception network may be firstly merged to obtain parameters merging results of different second local perception branches. Then, network parameters of different second local perception branches and/or network parameters of a second bypass branch are merged to obtain final reparameterization results. The equivalent replacement structure configuration of the second local perception module in the second feature extraction subnetwork in the second multi-path module in the joint perception network is performed by using the final reparameterization results.

Specifically, the second local perception module may be performed reparameterization by using the following formula:

$$F' = \sum_{i=1}^{n}\left(\frac{\gamma_i}{\sigma_i}F_i\right)$$

$$b' = \sum_{i=1}^{n}\left(-\frac{\mu_i\gamma_i}{\sigma_i} + \beta_i\right).$$

$F_i$ denotes the convolution kernel of the convolution layer of the i-th branch. $\mu_i$ and $\sigma_i$ denote the mean of the batch layer of the i-th branch and the variance of the batch layer of the i-th branch. $\gamma_i$ and $\beta_i$ denote the scale factor of the batch layer and horizontal shift factor of the batch layer. F' and b' denote the convolution kernel and the bias term parameter after re-parameterization.

Figure 6B:
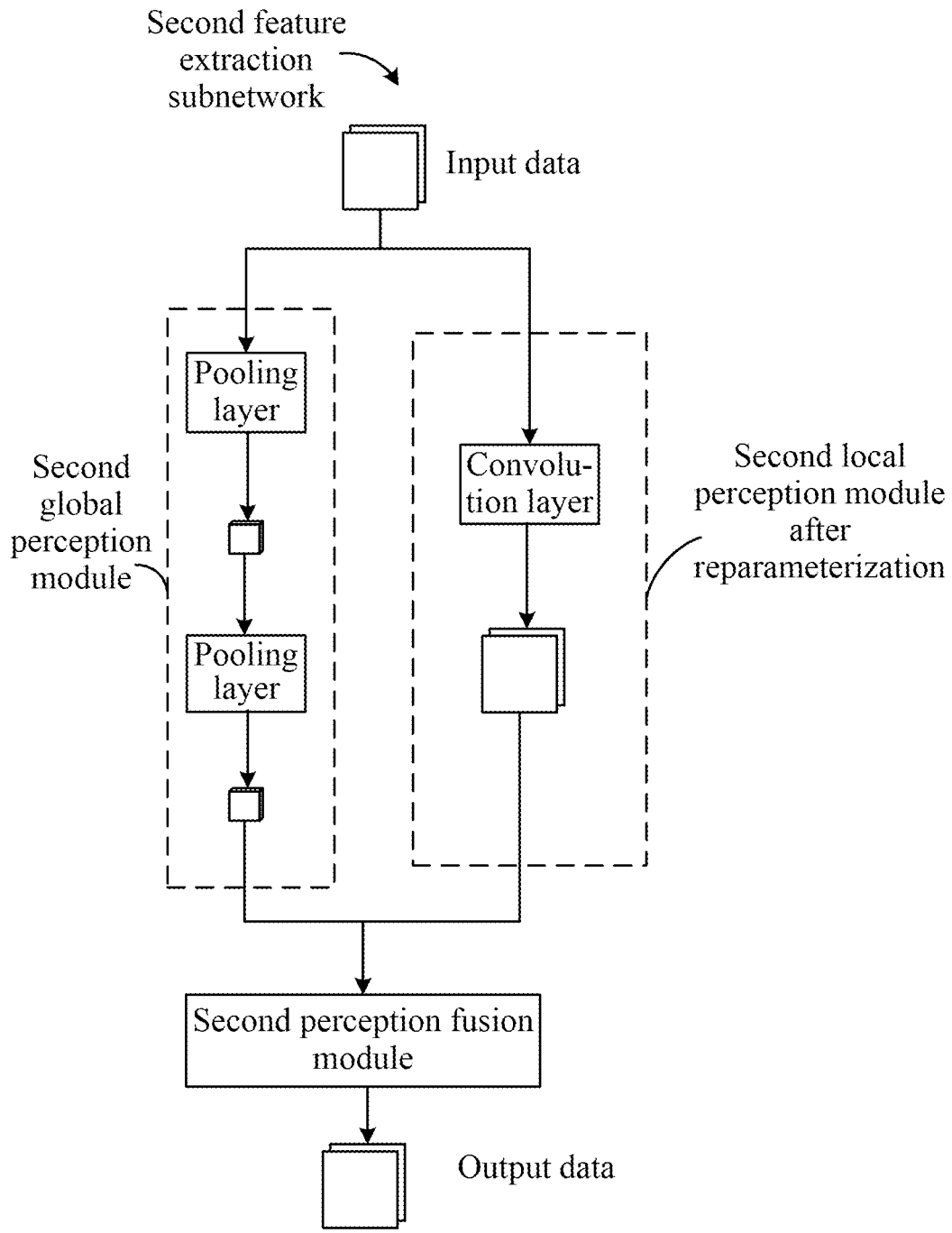
FIG. 6B is a diagram illustrating the structure of a second feature extraction subnetwork after reparameterization according to an embodiment of the present disclosure.

Referring to the diagram of a second feature extraction subnetwork after reparameterization shown in FIG. 6B, the second local perception module in the second feature extraction subnetwork replaces the multi-branch second local perception module in the initial joint perception model (referring to FIG. 3E) with a single-path structure. The convolution layer can be configured merely according to the results after reparameterization. Thus, the model results are greatly simplified, and the inference efficiency is helped to improve. In a specific example, if convolution kernels of 1*1, 1*3, 3*1, 3*3, 3*5, 5*3, and 5*5 are used in second local perception branches in the second local perception module in the model training stage, the size of the convolution kernel of the convolution layer after reparameterization is 5*5.

In an alternative embodiment, on a device that supports integer quantization (for example int8) and inference, integer quantization can be performed on an initial joint perception model or an initial joint perception model after reparameterization, thereby improving the inference speed.

When the first bypass branch in the first local perception module in a first multi-path module includes a first batch module, the scale variance in the first batch module is excessive large, resulting in uneven distribution of weights of convolution layers in the equivalent replacement structure after reparameterization and poor effect of integer quantization, affecting the accuracy of the inference results. To avoid the preceding situation, in an alternative embodiment, before performing reparameterization on the first local perception module of a first multi-path module, a first bypass branch including a first batch module may be replaced with a direct connection. This manner does not affect the overall model effect and benefits weight distribution of the convolution layer after reparameterization.

When the second bypass branch in the second local perception module in a second multi-path module includes a second batch module, the scale variance in the second batch module is excessive large, resulting in uneven distribution of weights of convolution layers in the equivalent replacement structure after reparameterization and poor effect of integer quantization, affecting the accuracy of the inference results. To avoid the preceding situation, in an alternative embodiment, before performing reparameterization on the second local perception module of a second multi-path module, a second bypass branch including a second batch module may be replaced with a direct connection. This manner does not affect the overall model effect and benefits the weight distribution of the convolution layer after reparameterization.

Figure 7:
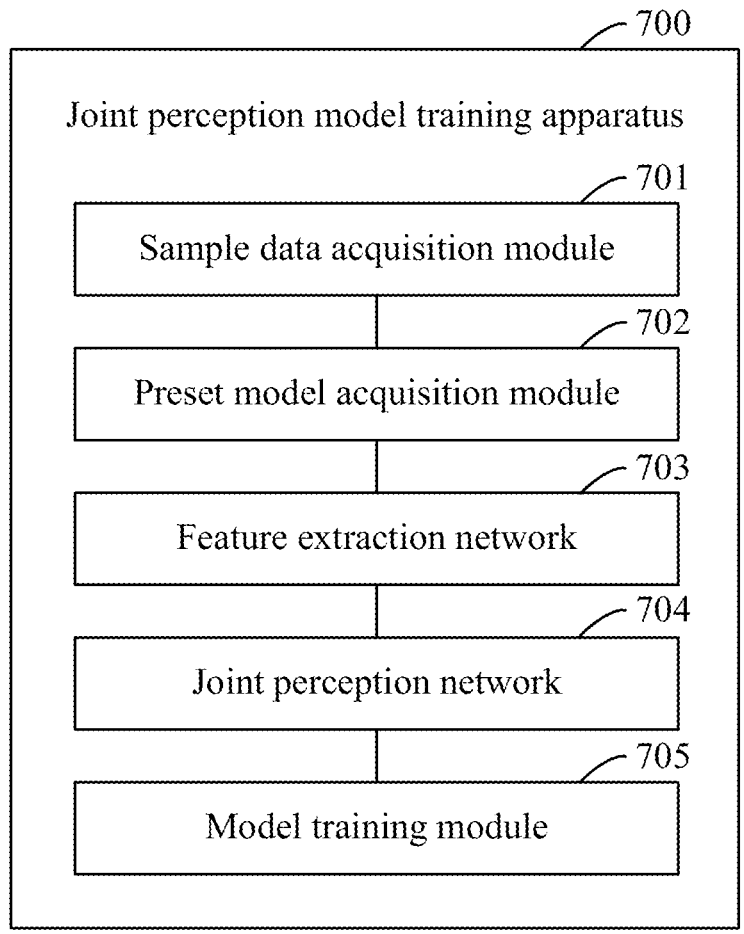
FIG. 7 is a diagram illustrating the structure of a joint perception model training apparatus according to an embodiment of the present disclosure.

As an implementation of each of the preceding joint perception model training methods, the present disclosure also provides an alternative embodiment of an execution apparatus that implements each of the preceding joint perception model training methods. Referring to FIG. 7, a joint perception model training apparatus 700 includes a sample data acquisition module 701, a preset model acquisition module 702, a feature extraction network 703, a joint perception network 704, and a model training module 705. The sample data acquisition module 701 is configured to acquire sample images and perception tags of the sample images.

The preset model acquisition module 702 is configured to acquire a preset joint perception model. The joint perception model includes a feature extraction network and a joint perception network.

The feature extraction network 703 is configured to perform feature extraction on the sample images to obtain target sample features.

The joint perception network 704 is configured to perform joint perception according to the target sample features to obtain perception prediction results.

The model training module 705 is configured to train a pre-constructed joint perception model according to the perception prediction results and the perception tags. The joint perception includes executing at least two perception tasks.

In an alternative embodiment, a feature extraction network 703 includes a base module and at least two first multi-path modules.

The base module is configured to perform downsampling on sample images to obtain initial sample features of different scales.

The first multi-path modules are configured to perform feature extraction of different perception tasks on the initial sample features to obtain target sample features under scales corresponding to the initial sample features.

In an alternative embodiment, a first multi-path module includes a first split subnetwork, a first feature extraction subnetwork, and a first fusion subnetwork.

The first split subnetwork is configured to split initial sample features according to a channel dimension to obtain first to-be-fused sample features and first to-be-processed sample features.

The first feature extraction subnetwork is configured to perform feature extraction on the first to-be-processed sample features to obtain first target intermediate sample features.

The first fusion subnetwork is configured to perform feature fusion on the first to-be-fused sample features and the first target intermediate sample features to obtain target sample features under scales corresponding to the initial sample features.

In an alternative embodiment, a first feature extraction subnetwork includes a first global perception module, a first local perception module, and a first perception fusion module.

The first global perception module is configured to perform global feature extraction on the first to-be-processed sample features to obtain a first global intermediate sample feature.

The first local perception module is configured to perform local feature extraction on the first to-be-processed sample features to obtain first local intermediate sample features.

The first perception fusion module is configured to perform feature fusion on the first global intermediate sample feature and the first local intermediate sample features to obtain first target intermediate sample features.

In an alternative embodiment, a first local perception module includes at least two first local perception branches.

Each of the first local perception branches is configured to perform local feature extraction on first to-be-processed sample features under different receptive fields to obtain first local intermediate sample features under corresponding receptive fields.

In an alternative embodiment, a first local perception module also includes a first bypass branch.

If the first bypass branch is a direct connection structure, the first bypass branch is configured to directly take first to-be-processed sample features as the first local intermediate sample features.

Alternatively, if the first bypass branch includes a first batch module, the first bypass branch is configured to perform normalization processing on first to-be-processed sample features through the first batch module to obtain the first local intermediate sample features.

In an alternative embodiment, a joint perception network 704 includes a detection head module.

The detection head module is configured to perform joint perception on target sample features through different task perception branches to obtain perception prediction results of the perception tasks.

In an alternative embodiment, a detection head module includes a second multi-path module and at least two task perception branches.

The second multi-path module is configured to perform feature extraction of the same category of targets under different perception tasks on target sample features to obtain perception sample features.

Each of the task perception branches is configured to determine the perception prediction result of the corresponding perception task according to the perception sample features.

In an alternative embodiment, a second multi-path module includes a second split subnetwork, a second feature extraction subnetwork, and a second fusion subnetwork.

The second split subnetwork is configured to split target sample features according to a channel dimension to obtain second to-be-fused sample features and second to-be-processed sample features.

The second feature extraction subnetwork is configured to perform feature extraction on the second to-be-processed sample features to obtain second target intermediate sample features.

The second fusion subnetwork is configured to perform feature fusion on the second to-be-fused sample features and the second target intermediate sample features to obtain perception sample features.

In an alternative embodiment, a second feature extraction subnetwork includes a second global perception module, a second local perception module, and a second perception fusion module.

The second global perception module is configured to perform global feature extraction on second to-be-processed sample features to obtain a second global intermediate sample feature.

The second local perception module is configured to perform local feature extraction on the second to-be-processed sample features to obtain second local intermediate sample features.

The second perception fusion module is configured to perform feature fusion on the second global intermediate sample feature and the second local intermediate sample features to obtain second target intermediate sample features.

In an alternative embodiment, a second local perception module includes at least two second local perception branches.

Each of the second local perception branches is configured to perform local feature extraction on second to-be-processed sample features under different receptive fields to obtain second local intermediate sample features under corresponding receptive fields.

In an alternative embodiment, a second local perception module also includes a second bypass branch.

If the second bypass branch is a direct connection structure, the second bypass branch is configured to directly take second to-be-processed sample features as the second local intermediate sample features.

Alternatively, if the second bypass branch includes a second batch module, the second bypass branch is configured to perform normalization processing on second to-be-processed sample features through the second batch module to obtain the second local intermediate sample features.

In an alternative embodiment, the number of detection head modules is at least two. Different detection head modules perform joint perception on different categories of targets.

The joint perception model training apparatus may perform the joint perception model training method provided by any embodiment of the present disclosure and has function modules and beneficial effects corresponding to each joint perception model training method.

Figure 8:
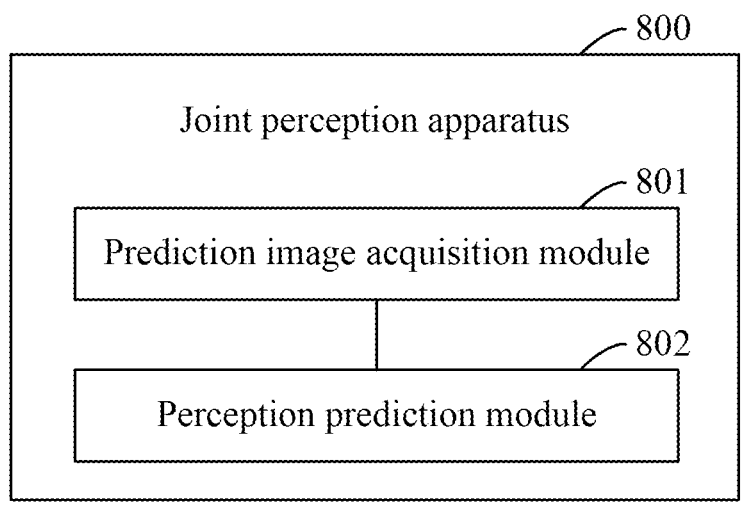
FIG. 8 is a diagram illustrating the structure of a joint perception apparatus according to an embodiment of the present disclosure.

As an implementation of each of the preceding joint perception methods, the present disclosure also provides an alternative embodiment of an execution apparatus that implements each of the preceding joint perception methods. Referring to FIG. 8, a joint perception apparatus 800 includes a prediction image acquisition module 801 and a perception prediction module 802.

The prediction image acquisition module 801 is configured to acquire prediction images.

The perception prediction module 802 is configured to input the prediction images to a target joint perception model to obtain perception prediction results. The target joint perception model is obtained based on the initial joint perception model trained by the joint perception model training apparatus according to any embodiment of the present disclosure.

In an alternative embodiment, a target joint perception model is obtained by performing integer quantization processing on network parameters of an initial joint perception model.

In an alternative embodiment, an initial joint perception model includes a first multi-path module. The first multi-path module includes at least two first local perception branches. A target joint perception model is obtained by performing reparameterization on the at least two first local perception branches.

Alternatively, the initial joint perception model includes a second multi-path module. The second multi-path module includes at least two second local perception branches. The target joint perception model is obtained by performing reparameterization on the at least two second local perception branches.

The joint perception apparatus may perform the joint perception method provided by any embodiment of the present disclosure and has function modules and beneficial effects corresponding to each joint perception method.

In the technical solutions of the present disclosure, the collection, storage, use, processing, transmission, provision, and disclosure of sample images, perception tags, prediction images, and the like, involved are in compliance with provisions of relevant laws and regulations and do not violate public order and good customs.

According to an embodiment of the present disclosure, the present disclosure also provides an electronic device, a readable storage medium, and a computer program product.

Figure 9:
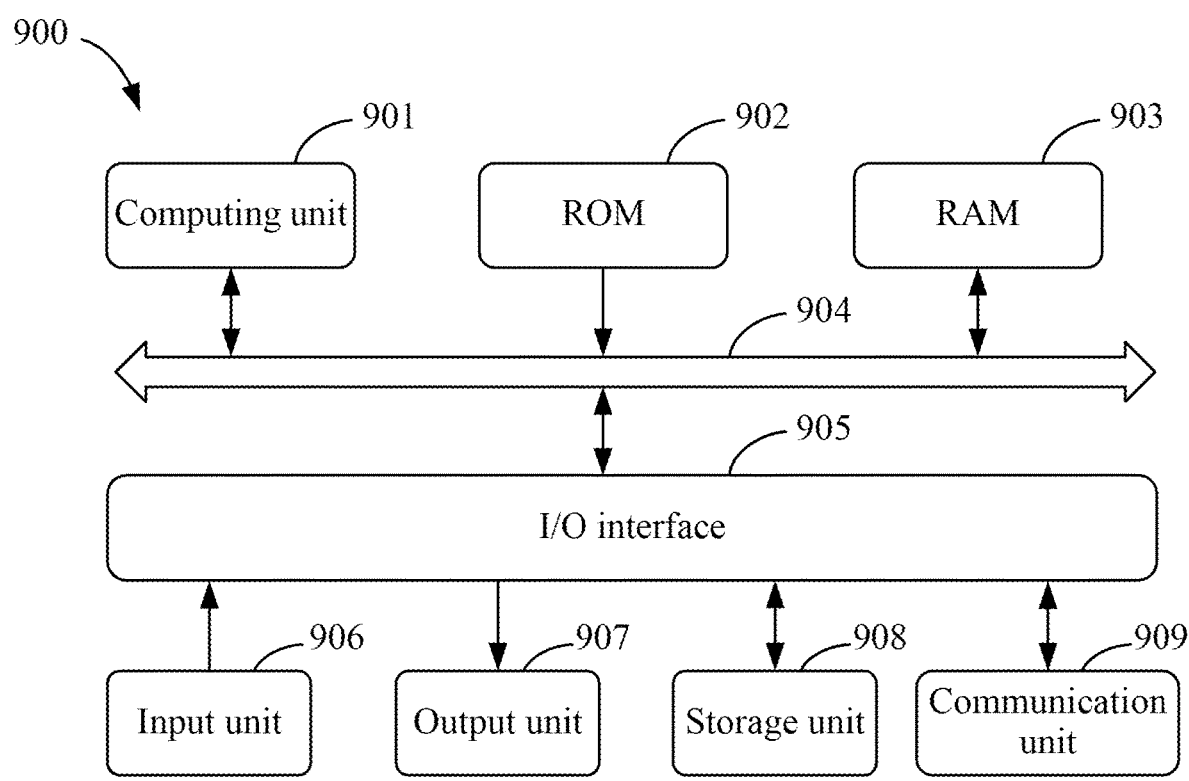
FIG. 9 is a block diagram of an electronic device for implementing a joint perception model training method and/or a joint perception method according to an embodiment of the present disclosure.

FIG. 9 is a block diagram of an example electronic device 900 that may be configured to implement an embodiment of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 9, the device 900 includes a computing unit 901. The computing unit 901 may perform various appropriate actions and processing according to a computer program stored in a read-only memory (ROM) 902 or a computer program loaded into a random-access memory (RAM) 903 from a storage unit 908. Various programs and data required for the operation of the device 900 may also be stored in the RAM 903. The computing unit 901, the ROM 902, and the RAM 903 are connected to each other through a bus 904. An input/output (I/O) interface 905 is also connected to the bus 904.

Multiple components in the device 900 are connected to the I/O interface 905. The multiple components include an input unit 906 such as a keyboard or a mouse, an output unit 907 such as various types of displays or speakers, the storage unit 908 such as a magnetic disk or an optical disc, and a communication unit 909 such as a network card, a modem or a wireless communication transceiver. The communication unit 909 allows the device 900 to exchange information/data with other devices over a computer network such as the Internet and/or various telecommunications networks.

The computing unit 901 may be various general-purpose and/or special-purpose processing components having processing and computing capabilities. Examples of the computing unit 901 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller, and microcontroller. The computing unit 901 executes various methods and processing described above, such as the joint perception model training method and/or the joint perception method. For example, in some embodiments, the joint perception model training method and/or the joint perception method may be implemented as a computer software program tangibly contained in a machine-readable medium such as the storage unit 908. In some embodiments, part or all of computer programs may be loaded and/or installed on the device 900 via the ROM 902 and/or the communication unit 909. When the computer program is loaded to the RAM 903 and executed by the computing unit 901, one or more steps of the preceding joint perception model training method and/or the joint perception method may be executed. Alternatively, in other embodiments, the computing unit 901 may be configured, in any other suitable manner (for example, by relying on firmware), to execute the joint perception model training method and/or the joint perception method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may contain or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS). The server may also be a server of a distributed system, or a server combined with a blockchain.

Artificial intelligence is the study of making computers simulate certain human thinking processes and intelligent behaviors (such as learning, reasoning, thinking and planning) both at the hardware and software levels. Artificial intelligence hardware technologies generally include technologies such as sensors, special-purpose artificial intelligence chips, cloud computing, distributed storage and big data processing. Artificial intelligence software technologies mainly include several major technologies such as computer vision technologies, speech recognition technologies, natural language processing technologies, machine learning/deep learning technologies, big data processing technologies, and knowledge mapping technologies.

It is to be understood that various forms of the preceding flows may be used with steps reordered, added, or removed. For example, the steps described in the present disclosure may be executed in parallel, in sequence, or in a different order as long as the desired result of the technical solutions provided in the present disclosure is implemented. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A joint perception model training method executed by an electronic device and comprising:
acquiring sample images and perception tags of the sample images;
acquiring a preset deep learning joint perception model, wherein the preset deep learning joint perception model comprises a feature extraction network and a joint perception network;
performing feature extraction on the sample images through the feature extraction network to obtain target sample features;
performing joint perception through the joint perception network according to the target sample features to obtain perception prediction results; and
training the preset deep learning joint perception model according to the perception prediction results and the perception tags, wherein the joint perception comprises executing at least two perception tasks;
wherein the feature extraction network comprises a base module and at least two first multi-path modules;
wherein performing feature extraction on the sample images through the feature extraction network to obtain the target sample features comprises: performing downsampling on the sample images through the base module to obtain initial sample features of each scale of at least two scales, wherein the at least two first multi-path modules have a one-to-one correspondence with the at least two scales; and for the initial sample features of each scale of at least two scales, performing feature extraction of different perception tasks on the initial sample features of the scale through a first multi-path module corresponding to the scale among the at least two first multi-path modules to obtain target sample features under the scale;
wherein each first multi-path module of the at least two first multi-path modules comprises a first split subnetwork, a first feature extraction subnetwork, and a first fusion subnetwork; and
wherein performing feature extraction of different perception tasks on the initial sample features of the scale through the first multi-path module corresponding to the scale among the at least two first multi-path modules to obtain the target sample features under the scale comprises:
splitting the initial sample features of the scale through the first split subnetwork in the first multi-path module corresponding to the scale according to a channel dimension to obtain first to-be-fused sample features and first to-be-processed sample features;
performing feature extraction on the first to-be-processed sample features through the first feature extraction subnetwork in the first multi-path module corresponding to the scale to obtain first target intermediate sample features; and
performing feature fusion on the first to-be-fused sample features and the first target intermediate sample features through the first fusion subnetwork in the first multi-path module corresponding to the scale to obtain the target sample features under the scale.

2. The method according to claim 1, wherein the first feature extraction subnetwork comprises a first global perception module, a first local perception module, and a first perception fusion module; and
performing feature extraction on the first to-be-processed sample features through the first feature extraction subnetwork in the first multi-path module corresponding to the scale to obtain the first target intermediate sample features comprises:
performing global feature extraction on the first to-be-processed sample features through the first global perception module in the first multi-path module corresponding to the scale to obtain a first global intermediate sample feature;
performing local feature extraction on the first to-be-processed sample features through the first local perception module in the first multi-path module corresponding to the scale to obtain first local intermediate sample features; and
performing feature fusion on the first global intermediate sample feature and the first local intermediate sample features through the first perception fusion module in the first multi-path module corresponding to the scale to obtain the first target intermediate sample features.

3. The method according to claim 2, wherein the first local perception module comprises at least two first local perception branches; and
performing local feature extraction on the first to-be-processed sample features through the first local perception module in the first multi-path module corresponding to the scale to obtain the first local intermediate sample features comprises:
performing local feature extraction on the first to-be-processed sample features through different first local perception branches in the first multi-path module corresponding to the scale under different receptive fields to obtain first local intermediate sample features under corresponding receptive fields.

4. The method according to claim 3, wherein the first local perception module further comprises a first bypass branch; and
performing local feature extraction on the first to-be-processed sample features through the first local perception module in the first multi-path module corresponding to the scale to obtain the first local intermediate sample features further comprises:
in a case where the first bypass branch is a direct connection structure, directly taking the first to-be-processed sample features as the first local intermediate sample features; or,
in a case where the first bypass branch comprises a first batch module, performing normalization processing on the first to-be-processed sample features through the first batch module in the first multi-path module corresponding to the scale to obtain the first local intermediate sample features.

5. The method according to claim 1, wherein the joint perception network comprises a detection head module; and
performing joint perception through the joint perception network according to the target sample features to obtain the perception prediction results comprises:
performing joint perception on the target sample features through different task perception branches in the detection head module to obtain perception prediction results of the perception tasks.

6. The method according to claim 5, wherein the detection head module comprises a second multi-path module and at least two task perception branches; and
performing joint perception on the target sample features through the different task perception branches in the detection head module to obtain the perception prediction results of the perception tasks comprises:
performing feature extraction of a same category of targets under different perception tasks on the target sample features through the second multi-path module to obtain perception sample features; and determining the perception prediction results of the perception tasks through each of the at least two task perception branches according to the perception sample features.

7. The method according to claim 6, wherein the second multi-path module comprises a second split subnetwork, a second feature extraction subnetwork, and a second fusion subnetwork; and performing feature extraction of the same category of targets under different perception tasks on the target sample features through the second multi-path module to obtain the perception sample features comprises:

splitting the target sample features through the second split subnetwork according to a channel dimension to obtain second to-be-fused sample features and second to-be-processed sample features;

performing feature extraction on the second to-be-processed sample features through the second feature extraction subnetwork to obtain second target intermediate sample features; and performing feature fusion on the second to-be-fused sample features and the second target intermediate sample features through the second fusion subnetwork to obtain the perception sample features.

8. The method according to claim 7, wherein the second feature extraction subnetwork comprises a second global perception module, a second local perception module, and a second perception fusion module; and performing feature extraction on the second to-be-processed sample features through the second feature extraction subnetwork to obtain the second target intermediate sample features comprises:

performing global feature extraction on the second to-be-processed sample features through the second global perception module to obtain a second global intermediate sample feature;

performing local feature extraction on the second to-be-processed sample features through the second local perception module to obtain second local intermediate sample features; and performing feature fusion on the second global intermediate sample feature and the second local intermediate sample features through the second perception fusion module to obtain the second target intermediate sample features.

9. The method according to claim 8, wherein the second local perception module comprises at least two second local perception branches; and performing local feature extraction on the second to-be-processed sample features through the second local perception module to obtain the second local intermediate sample features comprises:

performing local feature extraction on the second to-be-processed sample features through different second local perception branches under different receptive fields to obtain second local intermediate sample features under corresponding receptive fields.

10. The method according to claim 9, wherein the second local perception module further comprises a second bypass branch; and performing local feature extraction on the second to-be-processed sample features through the second local perception module to obtain the second local intermediate sample features further comprises:

in a case where the second bypass branch is a direct connection structure, directly taking the second to-be-processed sample features as the second local intermediate sample features; or, in a case where the second bypass branch comprises a second batch module, performing normalization processing on the second to-be-processed sample features through the second batch module to obtain the second local intermediate sample features.

11. The method according to claim 5, wherein at least two detection head modules are provided, and different detection head modules perform joint perception on different categories of targets.

12. A joint perception method executed by an electronic device and comprising:

acquiring prediction images; and inputting the prediction images to a target joint perception model to obtain perception prediction results, wherein the target joint perception model is obtained based on an initial joint perception model trained by the joint perception model training method according to claim 1.

13. The method according to claim 12, wherein the target joint perception model is obtained by performing integer quantization processing on network parameters of the initial joint perception model.

14. The method according to claim 12, wherein the initial joint perception model comprises a first multi-path module, the first multi-path module comprises at least two first local perception branches, and the target joint perception model is obtained by performing reparameterization on the at least two first local perception branches; and/or, the initial joint perception model comprises a second multi-path module, the second multi-path module comprises at least two second local perception branches, and the target joint perception model is obtained by performing reparameterization on the at least two second local perception branches.

15. A non-transitory computer-readable storage medium storing computer instructions, wherein the computer instructions are configured to cause a computer to execute the joint perception model training method according to claim 1.

16. An electronic device comprising:

at least one processor; and a memory communicatively connected to the at least one processor, wherein the memory stores instructions executable by the at least one processor, and the instructions are executed by the at least one processor to cause the at least one processor to execute a joint perception model training method, wherein the joint perception model training method comprises:

acquiring sample images and perception tags of the sample images;

acquiring a preset deep learning joint perception model, wherein the preset deep learning joint perception model comprises a feature extraction network and a joint perception network;

performing feature extraction on the sample images through the feature extraction network to obtain target sample features;

performing joint perception through the joint perception network according to the target sample features to obtain perception prediction results; and training the preset deep learning joint perception model according to the perception prediction results and the perception tags, wherein the joint perception comprises executing at least two perception tasks;

wherein the feature extraction network comprises a base module and at least two first multi-path modules;

wherein performing feature extraction on the sample images through the feature extraction network to obtain the target sample features comprises: performing downsampling on the sample images through the base module to obtain initial sample features of each scale of at least two scales, wherein the at least two first multi-path modules have a one-to-one correspondence with the at least two scales; and for the initial sample features of each scale of at least two scales, performing feature extraction of different perception tasks on the initial sample features of the scale through a first multi-path module corresponding to the scale among the at least two first multi-path modules to obtain target sample features under the scale;

wherein each first multi-path module of the at least two first multi-path modules comprises a first split subnetwork, a first feature extraction subnetwork, and a first fusion subnetwork; and wherein performing feature extraction of different perception tasks on the initial sample features of the scale through the first multi-path module corresponding to the scale among the at least two first multi-path modules to obtain the target sample features under the scale comprises:

splitting the initial sample features of the scale through the first split subnetwork in the first multi-path module corresponding to the scale according to a channel dimension to obtain first to-be-fused sample features and first to-be-processed sample features;

performing feature extraction on the first to-be-processed sample features through the first feature extraction subnetwork in the first multi-path module corresponding to the scale to obtain first target intermediate sample features; and performing feature fusion on the first to-be-fused sample features and the first target intermediate sample features through the first fusion subnetwork in the first multi-path module corresponding to the scale to obtain the target sample features under the scale.

* * * * *